US006324165B1

(12) United States Patent
Fan et al.

(10) Patent No.: US 6,324,165 B1
(45) Date of Patent: Nov. 27, 2001

(54) LARGE CAPACITY, MULTICLASS CORE ATM SWITCH ARCHITECTURE

(75) Inventors: Ruixue Fan, Plainsboro; Brian L. Mark, Princeton; Gopalakrishnan Ramamurthy, Cranbury, all of NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 08/923,978

(22) Filed: Sep. 5, 1997

(51) Int. Cl.$^7$ .................................................. H04L 12/26
(52) U.S. Cl. ........................................... 370/232; 370/413
(58) Field of Search .................................... 370/230, 231, 370/232, 233, 234, 235, 236, 238, 252, 253, 412, 413, 414, 415, 416, 417, 418, 428, 429, 465; 710/52, 57

(56) References Cited

U.S. PATENT DOCUMENTS

| | | | |
|---|---|---|---|
| 5,475,679 | * 12/1995 | Munter | 370/395 |
| 5,521,916 | 5/1996 | Choudhurry et al. | 370/60.1 |
| 5,539,747 | * 7/1996 | Ito et al. | 370/235 |
| 5,577,035 | * 11/1996 | Hayter et al. | 370/395 |
| 5,719,853 | * 2/1998 | Ikeda | 370/229 |
| 5,867,480 | * 2/1999 | Thomas et al. | 370/230 |
| 5,870,384 | * 2/1999 | Salovuori et al. | 370/235 |
| 5,914,936 | * 6/1999 | Hatono et al. | 370/230 |
| 5,956,342 | * 9/1999 | Manning et al. | 370/414 |
| 5,982,771 | * 11/1999 | Caldara et al. | 370/389 |
| 6,002,667 | * 12/1999 | Manning et al. | 370/232 |
| 6,141,323 | * 6/1996 | Rusu | 370/236 |

FOREIGN PATENT DOCUMENTS

| | | |
|---|---|---|
| 0 661 851 | 7/1995 | (EP). |
| 0680180 | 11/1995 | (EP). |
| 2272820 | 5/1994 | (GB). |
| 5-344143 | 12/1993 | (JP). |
| 6-164627 | 6/1994 | (JP). |
| 7-183886 | 7/1995 | (JP). |
| 8-288953 | 11/1996 | (JP). |

OTHER PUBLICATIONS

M. Karol, et al., "Input Versus Output Oueuing on a Space–Division Packet Switch," IEEE Transactions on Communications, vol. COM–35, No. 12, Dec. 1987, pp. 1347–1356.

Y. Yeh, et al., "The Knockout Switch: A Simple, Modular Architecture for High–Performance Packet Switching," IEEE ISAC, vol. 5, No. 8, 1987, pp. 1274–1283.

R. Fan, et al., "Expandable Atom Switch Architecture (XATOM) for ATM LANs," ICC '94.

(List continued on next page.)

Primary Examiner—Wellington Chin
Assistant Examiner—Kwang B. Yao
(74) Attorney, Agent, or Firm—Sughrue, Mion, Zinn, Macpeak & Seas, PLLC

(57) ABSTRACT

A large capacity ATM core switch architecture is disclosed, which supports multiple traffic classes and quality-of-service (QoS) guarantees. The switch supports both real-time traffic classes with strict QoS requirements, e.g., CBR and VBR, and non-real-time traffic classes with less stringent requirements, e.g., ABR and UBR. The architecture also accommodates real-time and non-real-time multicast flows in an efficient manner. The switch consists of a high-speed core module that interconnects input/output modules with large buffers and intelligent scheduling/buffer management mechanisms. The scheduling can be implemented using a novel dynamic rate control, which controls internal congestion and achieves fair throughput performance among competing flows at switch bottlenecks. In the dynamic rate control scheme, flows are rate-controlled according to congestion information observed at bottleneck points within the switch. Each switch flow is guaranteed a minimum service rate plus a dynamic rate component which distributes any unused bandwidth in a fair manner.

23 Claims, 18 Drawing Sheets

OTHER PUBLICATIONS

G. Ramamurthy, et al., "Multi–class Connection Admission Control Policy for High Speed ATM Switches," 1997 IEEE.

A. Kolarov, et al., "A Control Theoretic Approach to the Design of Closed Loop Rate Based Flow Control for High Speed ATM Networks," 1997 IEEE.

Masayuki Shinohara et al; "Large Scale ATM Switch With Multiple Qos Gurantee"; Aug. 20, 1996; The Institute of Electronics Information and Communication Engineers vol. 96, No. 215; pp. 73–78.

Masayuki Shinohara et al; "Internal Congestion Control In Large Scale ATM Switch"; Dec. 13, 1996; The Institute of Electronics Information and Communication Engineers vol. 96, No. 406; pp. 13–18.

Masayuki Shinohara et al; "Internal Congestion Control In Large Scale ATM Switch"; Proceedings of the 1997 IEICE General Conference, Mar. 24–27, 1997; pp. 44.

R. Fan et al., "Expandable Atom Switch Architecture (XATOM) for ATM LANs", ICC ' May 1994, pp. 402–209.

Pierre E. Boyer et al, "The Spacer–Controller An Efficient UPC/NPC for ATM Networks", Proceedings of the International Switching Symposium, vol. 2, No. 14, Oct. 1992, pp. 316–320.

* cited by examiner

LARGE CAPACITY, MULTICLASS CORE ATM SWITCH ARCHITECTURE

This application relates to U.S. application Ser. No. 08/929,820 which is incorporated herein by reference.

BACKGROUND OF THE INVENTION

1. Field of the Invention

The subject invention relates to Asynchronous Transfer Mode (ATM) networks and, more specifically, to a large capacity, multiclass core ATM switch capable of efficiently serving requests originated from various classes of sources, such as those defined by the ATM Forum.

2. Description of the Related Art

Historically, telephony networks and computing networks have been developed in diverging directions. To ensure effective real Lime communication, telephony TDM networks establish a channel which is maintained for the duration of the call. On the other hand, since most data transferred on computer networks is not real time data, packet switching routes the packets without establishing a channel. One problem with the TDM networks is that a source may sit idle, unnecessarily occupying an established channel. One problem with packet switching is that it requires high protocol overhead and is, therefore, not suitable for real time communication.

Asynchronous Transfer Mode (ATM) technology has emerged as the key technology for future communication switching and transmission infrastructures. For an informative collection of notes on ATM Networks, the reader is referred to: *Lecture Notes in Computer Science, Broadband Network Teletraffic*, James Roberts, Ugo Mocci and Jorma Virtamo (Eds.), vol 1155, Springer 1991, ISBN 3-540-61815-5. The main strength of ATM network lies in its potential for supporting applications with widely different traffic characteristics and quality-of-service (QoS) requirements. The goal of ATM networks is to combine and harness the advantages of TDM networks and packet switching, while ridding of the respective disadvantages of these networks. Thus, ATM switching will be able to provide a single network which replaces the TDM and packet switching networks.

The ATM Forum has established various guidelines for ATM design, which can be found in the various publications of the ATM Forum. However, for the reader's convenience, certain relevant guidelines and acronyms are described hereinbelow.

Currently, the ATM Forum has established four main classes of traffic, generally divided into real time traffic and non-real time traffic. Constant Bit Rate (CBR) is used for real time traffic, i.e., mainly for audio. Admission of a CBR call request can be determined by the requested peak rate. Variable Bit Rate (VBR) can be used for video transmission; however, since it is very bursty, admission of a VBR call request needs to account for peak rate, sustainable rate, and burst size. Even upon admittance, it is desirable to condition the transmission from such a source, such as by using leaky buckets. CBR and VBR are real time traffic classes.

Available Bit Rate (ABR) and Unspecified Bit Rate (UBR) are non-real time traffic, and are mainly used for computer communication. Conventionally, ABR traffic is controlled using a closed-loop feedback, which accounts for about 3% overhead. Generally, the source generates Resource Management Cells (RM cells) which propagate through the network. As each RM cell passes through a switch, it is updated to indicate the supportable rate, i.e., the rate the source should transmit the data (generally called explicit rate). These RM cells are fed back to the source so that the source may adjust its transmission rate accordingly. It should be appreciated that such a feedback system has substantial delay and, therefore, cannot be used for real time traffic.

Depending on the class of the transmission, the source would request the appropriate Quality of Service (QoS). Generally, QoS is determined with reference to transmission delay, cell loss probability, and cell loss delay variations. As noted above, even when a call is admitted, the source's transmission may be regulated, for example, by controlling the peak rate using leaky buckets. Therefore, in the connection set-up, the source would negotiate for the appropriate Usage Parameter Control (UPC) values, and indicate the QoS desired. Then the Connection Admittance Control (CAC) would determine whether the network can support the call.

The source would also indicate a destination address. Using the destination address, the ATM network would establish a Virtual Channel (VC) and provide the source with the appropriate VC indicator. The source would then insert the VC indicator in each transmitted cell. The channel would remain constant for the duration of the call, i.e., all cells of the call would be routed via the same channel. However, it is termed a virtual channel since it may be shared with other sources, i.e., there is no one-to-one correspondence between a channel and a source.

Generally, the admitted calls would be associated with certain buffers in the ATM switch, and a scheduling algorithm would determine which buffer, i.e., which call, is to be served at any given time. The scheduling should preferably account for the QoS guaranteed during the call admittance, and ensure fair sharing of the network resources. It has also been advocated that the algorithm be work conserving, i.e., that it should not idle if cells are present in a buffer.

A variety of switch architectures have been proposed for ATM networks. A switch may consist of a single stage or multiple stages of smaller single stage switches. Switches can be generally classified according to the location of the cell buffers, i.e., input buffered or output buffered. It is well-known that output-buffering achieves optimum throughput (see, e.g., M. J. Karol, M. G. Hluchyj, and S. P. Morgan, *Input vs. Output Queueing on a Space-Division Packet Switch*, IEEE Trans. Comm., Vol 35, pp. 1347–1356, December 1987). However, an output-buffered architecture requires the output buffers to operate at an access speed of N times the line rate, where N is the number of input ports. The factor of N speedup can be reduced to L=8 by using the so-called "knockout principle" (see, Y. S. Yeh, M. G. Hluchyj, and A. S. Acampora, *The Knockout Swith: A Simple, Modular Architecture for High-Performance Packet Switching*, IEEE J. Select. Areas Comm., Vol. 5, pp. 1274–1283, October 1987). However, unwanted cell loss may occur when the switch is stressed with nonuniform traffic patterns. Shared memory switches also require buffers with N times speed-up.

Input-buffered switches do not require any speed-up, but suffer lower throughput due to head-of-line blocking. That is, a cell at the head of the input buffer queue blocks all other cells in the buffer until the destination output line is ready to accept the head-of-line cell. However, it may be the case that other destination output lines are ready to accept other cells which are blocked by the head-of-line cell. This may lead to inefficient use of the bandwidth and cause unnecessary delays.

Current ATM switches have relatively simple scheduling and buffer management mechanisms with limited support for QoS. On the other hand, as ATM technology proliferates in the wide area network (WAN) carrier market, more sophisticated switches are needed in the WAN core which can handle much larger volumes of traffic from a more diverse set of applications. The next generation WAN core switches will have large capacities and the ability to provide QoS support for multiple classes of traffic. Therefore, there is a need for a switch capable of supporting such diverse traffic.

SUMMARY OF THE INVENTION

The present invention provides a large capacity ATM switch which supports multiple traffic classes and quality-of-service (QoS) guarantees. The switch supports both real-time traffic classes with strict QoS requirements, e.g., CBR and VBR, and non-real-time traffic classes with less stringent requirements, e.g., ABR and UBR. The architecture can also accommodate real-time and non-real-time multicast flows in an efficient manner. The switch is based on an input-output buffered architecture with a high-speed core switch module which interconnects input/output modules with large buffers. Controlled class-based access is provided to the core switch module through intelligent scheduling and queue management mechanisms.

The switch would preferably be utilized in conjunction with a new scheduling method, dynamic rate control (DRC), invented by the present inventors and described in the related U.S. patent application Ser. No. 08/924,820. The inventive DRC controls internal congestion and achieves fair throughput performance among competing flows at switch bottlenecks. This is achieved via closed-loop control using a proportional-derivative (PD) controller at each bottleneck. The DRC scheme guarantees each flow a minimum service rate plus a dynamic rate component which distributes any unused bandwidth in a fair manner. This forms the basis for an integrated scheme which can provide QoS for different traffic classes.

In the large switch, the DRC scheduling mechanism operates in conjunction with intelligent queue management mechanisms. The DRC scheduler detects congestion at bottleneck points in the switch and alleviates the congestion in a controlled manner by moving cell queueing towards the input side of the switch, where cell discard mechanisms such as early packet discard (EPD) and partial packet discard (PPD) may be applied to individual class queues. Also, cells tagged as low priority, i.e., with the cell loss priority (CLP) bit set to one, are dropped when a queue exceeds a threshold. With DRC, the cell discard mechanisms operate more effectively, since cells are dropped in a controlled manner according to the level of switch congestion.

The inventive large capacity switch described herein represents a significant advance over current switches both in aggregate throughput and in support for multiple QoS classes. The design has the flexibility and scalability to meet the needs of present and future high performance ATM networks.

DETAILED DESCRIPTION OF THE PREFERRED EMBODIMENTS

1. General Structure

In its preferred embodiment, the inventive large capacity switch is a single stage switch which may be used as a switching element in a still larger capacity multistage switch. The inventive large capacity switch may be classified as an input-output buffered switch (cf. R. Fan, H. Suzuki, K. Yamada, and N. Matsuura, *Expendable ATOM Switch Architecture (XATOM) for ATM LANs*, in Proc. ICC '94, pp. 99–103, May 1994). The goal of input-output buffered architecture is to combine the strengths of input and output buffers.

In the preferred embodiment, the output buffers are small, fast buffers which are part of the core switch module. Cell queueing occurs primarily at the input modules, in which the buffers operate at the line speed. Head-of-line blocking is avoided by queueing cells in the input module according to destination output port or according to destination output line. This architecture achieves the throughput of output-buffered architectures, without incurring the expense of fast, large output buffers. Moreover, buffering at the input ports is more efficient than output buffering. For the same cell loss performance, fewer buffers overall are needed when cells are queued at the input ports rather than at the output ports.

The backbone of the inventive large multiclass switch is a new high-speed core switch element which provides fast, simple, classless, and loss-free switching. Controlled access to the core switch module is provided through intelligent scheduling mechanisms at the input modules (IM). The input modules may be arranged to allow a per class queuing or a per virtual channel queuing.

Figure 1:
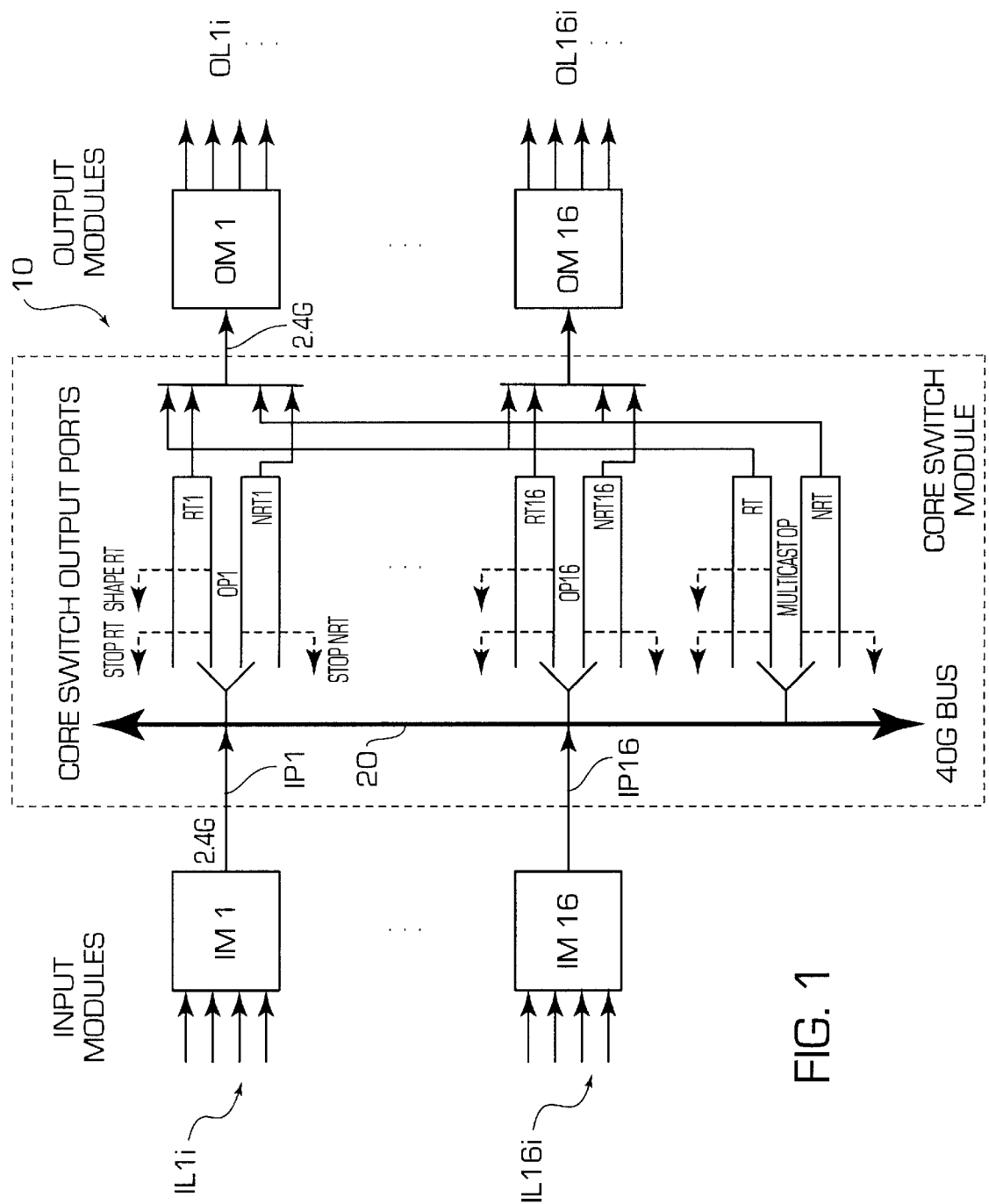
FIG. 1 is a diagram depicting the architecture of the core switch module according to the preferred embodiment of the present invention.

An overall view of the preferred embodiment of the large switch is illustrated in FIG. 1. The core switch module, 10, in the illustrated embodiment, consists of 16 input ports, IP1 to IP16, 16 unicast output ports OP1 to OP16, and one multicast output port MOP, all connected to a high-speed TDM bus 20. In the exemplary embodiment, the input and output ports of the core module operate at the rate of 2.4 Gbps and the TDM bus operates at the rate of 40 Gbps. In one cell time, the core switch module can switch (at most) one cell from each input port to any of the output ports.

An input module (IMi) is attached to each input port IPi of the core module. The output line capacity of the input modules IMi is 2.4 Gbps. The input side of the input module IMi is coupled to input lines IL1i–IL16i which may be configured in one of three ways: 1) one 2.4 Gbps line; 2) four 622 Mbps lines; 3) sixteen 155 Mbps lines. In all cases of the exemplary embodiment, the aggregate input line capacity to the input module IMi is 2.4 Gbps. Notably, the input lines IL1i–IL16i can carry transmission of sources classified in different classes with different QoS requirements.

Figure 2A:
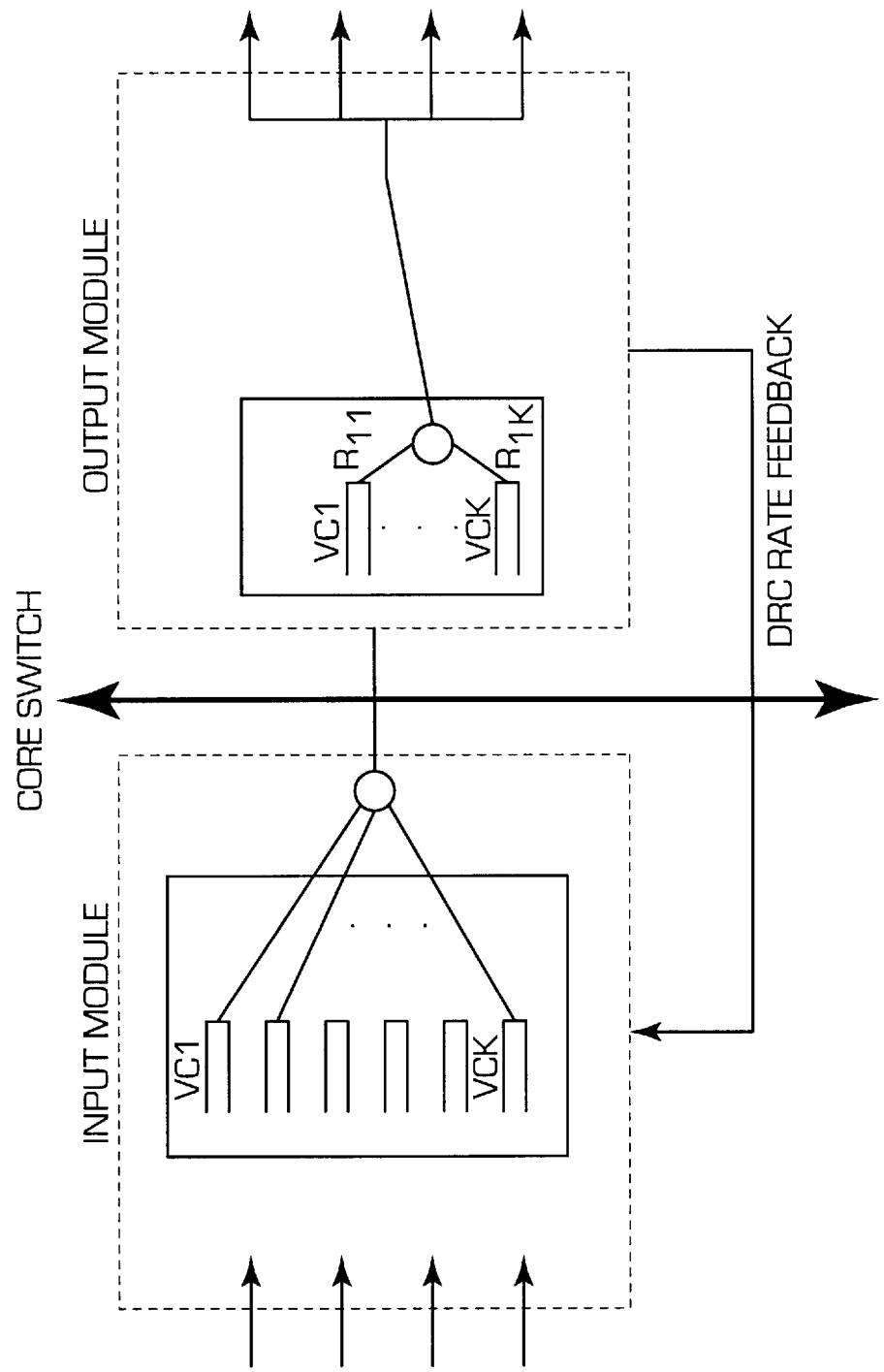
FIG. 2a, depicts the structure of the input and output modules configured for a per vc queuing according to the preferred embodiment of the present invention.
Figure 2B:
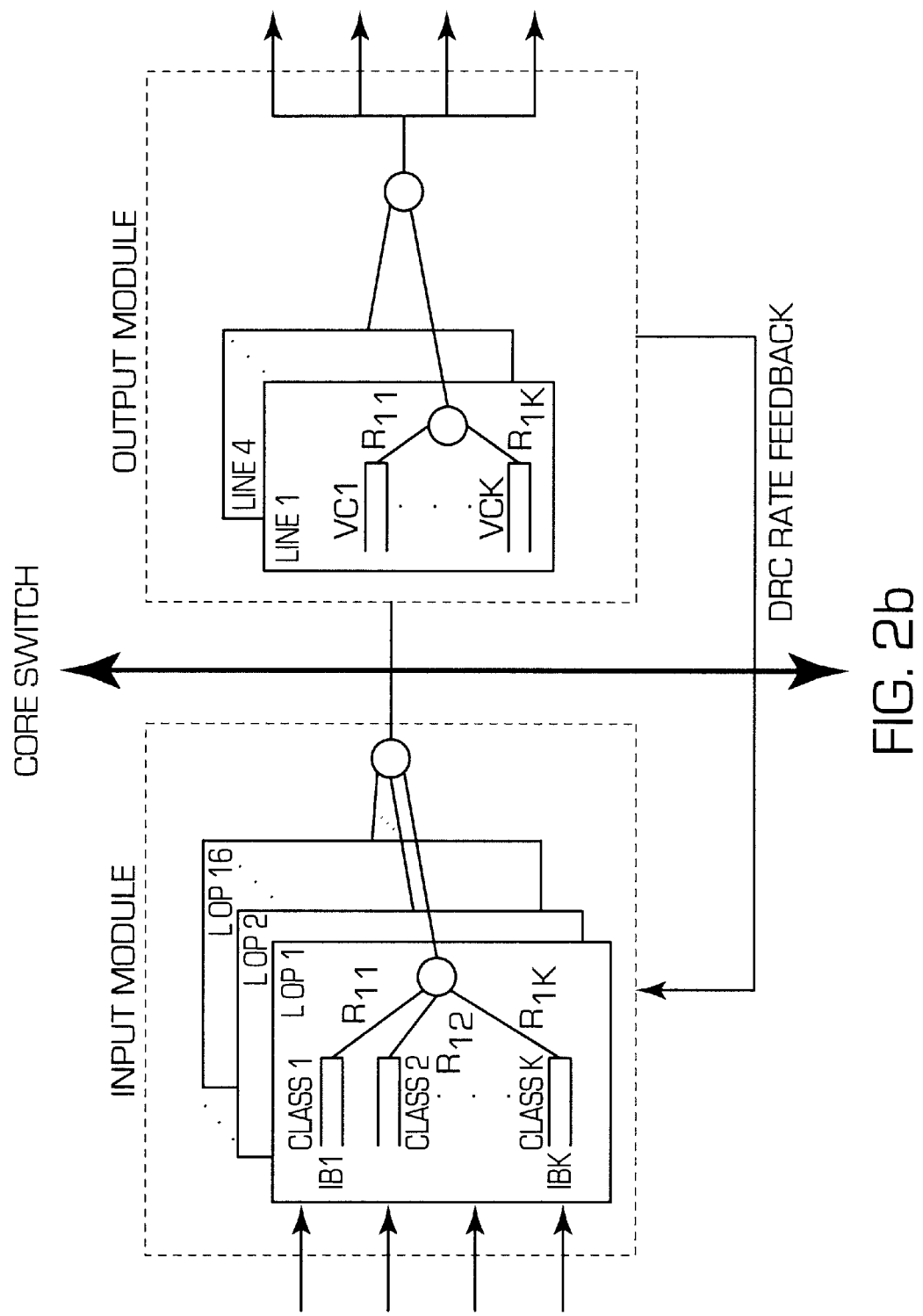
FIG. 2b, depicts the structure of the input and output modules configured for a per class output port queing according to the preferred embodiment of the present invention.
Figure 2C:
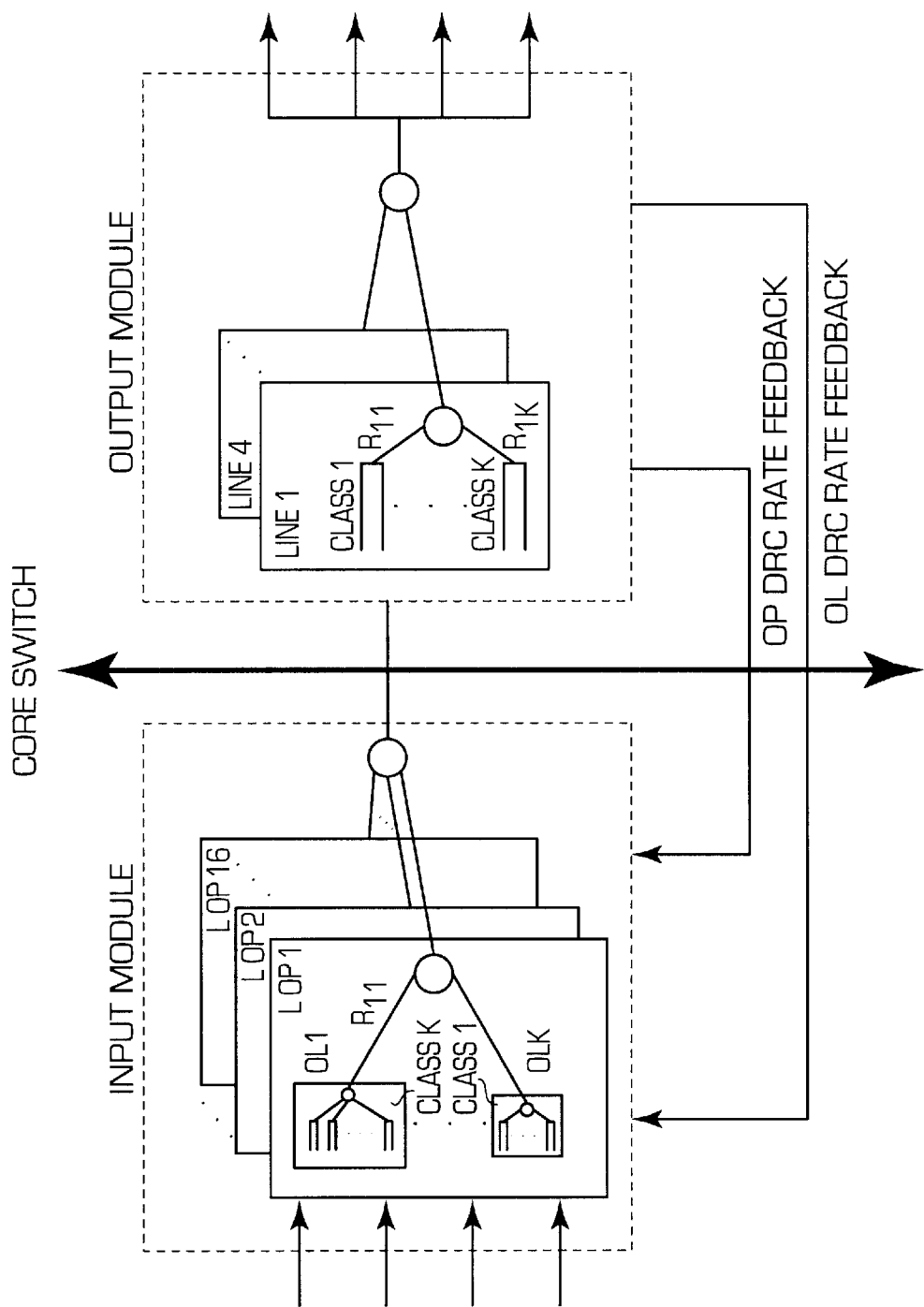
FIG. 2c depicts the structure of the input and output modules configured for a per class-output line queing according to the preferred embodiment of the present invention.

The input modules can be arranged according to per virtual channel (VC) queuing (FIG. 2a), per class queuing according to output port (FIG. 2b), and per class queuing according to output line (FIG. 2c). Per VC queuing provides the best throughput, but requires a large number of buffers in each input module. Therefore, while per VC queuing is preferable from the design stand point, it may not be preferable from the implementation stand point.

As shown in FIG. 2b, in a per class queuing according to output port, each input module IMi comprises a number of layers/planes LOP1–LOP16 corresponding to the number of output modules, i.e., in the exemplary embodiment 16 layers. Each layer includes several buffers IB1–IBk corresponding to the number, k, of classes sought to be supported. Each input buffer IBi is guaranteed a service rate Ri1–Rik. Thus, an incoming cell is routed to the proper layer corresponding to the output port destination, and to the appropriate input buffer within the layer depending upon its class. The DRC rate feedback is provided from the output module and corresponds to the load on the output ports.

As shown in FIG. 2c, two sets of layers/planes are provided in the input module when the switch is arranged for a per class queuing according to output lines. First, the output module is divided into output port planes OP1–OP16 corresponding to the output ports. Then, each output port plane is divided into output line planes OL1–OLk corresponding to the output lines. Finally, each output line plane includes a plurality of buffers corresponding to the classes. In this case, two DRC rate feedbacks are provided, one indicating the load on the output ports and one indicating the load on the output lines.

Similarly, an output module (OMi) is attached to each unicast output port OPi. The output side of an OM may consist of one, four, or sixteen output lines with an aggregate output line capacity of 2.4 Gbps. The output module is divided into output planes corresponding to the output lines. Each output plane includes a plurality of buffers corresponding to the supportable classes.

Each output port (OPi) of the core switch module 10 is associated with two small output buffers, one, RTi, designated for real-time traffic and the other, NRTi, designated for non-real-time traffic. In the preferred embodiment, each output buffer, RTi or NRTi, can store on the order of two hundred cells. At the output of each unicast output port, the output lines for the non-real-time and real-time buffers are combined with the corresponding output lines of the multicast output port. During each cell time, (at most) one cell is transmitted from the output of a unicast output port OPi to its corresponding output module OMi. With reference to FIG. 1, the order of priority is as follows: 1) multicast real-time traffic; 2) unicast real-time traffic; 3) multicast non-real-time traffic; 4) unicast non-real-time traffic.

While the core switch module provides the basic hardware to perform unicast and multicast switching, in the preferred embodiment most of the intelligence of the switch resides in the input modules (IMi) and output modules (OMi). Each input/output module is equipped with a scheduler, a queue manager, and a large buffer space. Tight coupling between the connection admission controller and the input/output modules ensures that each queue flow meets its quality-of-service requirements.

The IM is responsible for ATM cell header translation and buffering of incoming cells in queues organized by VC (FIG. 2a) class and destination core switch output port (OPi) (FIG. 2b), or class and destination output line (FIG. 2c). The term queue flow is used to represent the aggregate traffic of all connections corresponding to a given queue. The queues are generic, with programmable QoS that can be flexibly assigned to any traffic class by the connection admission controller (CAC) (see FIG. 3). The class queues are further classified as real-time or non-real-time. During each cell time, a scheduler in the input module IMi selects one (if any) of the queues. From the selected queue, the head-of-line cell is transmitted over the TDM bus to the destination output port OPi. The queue manager allocates cell buffers to queues and discards cells when buffer thresholds are exceeded. Cell queuing in the input module IMi is designed to avoid congestion at an output port in the core switch module. Congestion may occur when the sum of the queue flow from different input modules IMi exceeds the capacity C at an output port OPi. Under such circumstances, the output port OP becomes a bottleneck point.

The architecture of the output module is similar to that of the input module. Each output module operates as an intelligent demultiplexer, basically independent of the rest of the switch. In the output module, OMi, cells are queued according to class and destination output line. Cell queuing in the output module OMi results from congestion at an output line OLi attached to the output module OMi; i.e., the sum of queue flows to the output line may exceed its capacity. Thus, the output line, OLi, is another potential bottleneck point for a queue flow in the switch due to rate mismatch. Internal switch congestion at the output port OPi and output line OLi bottleneck points is controlled by means of intelligent scheduling and queue management within the input/output modules.

Figure 3:
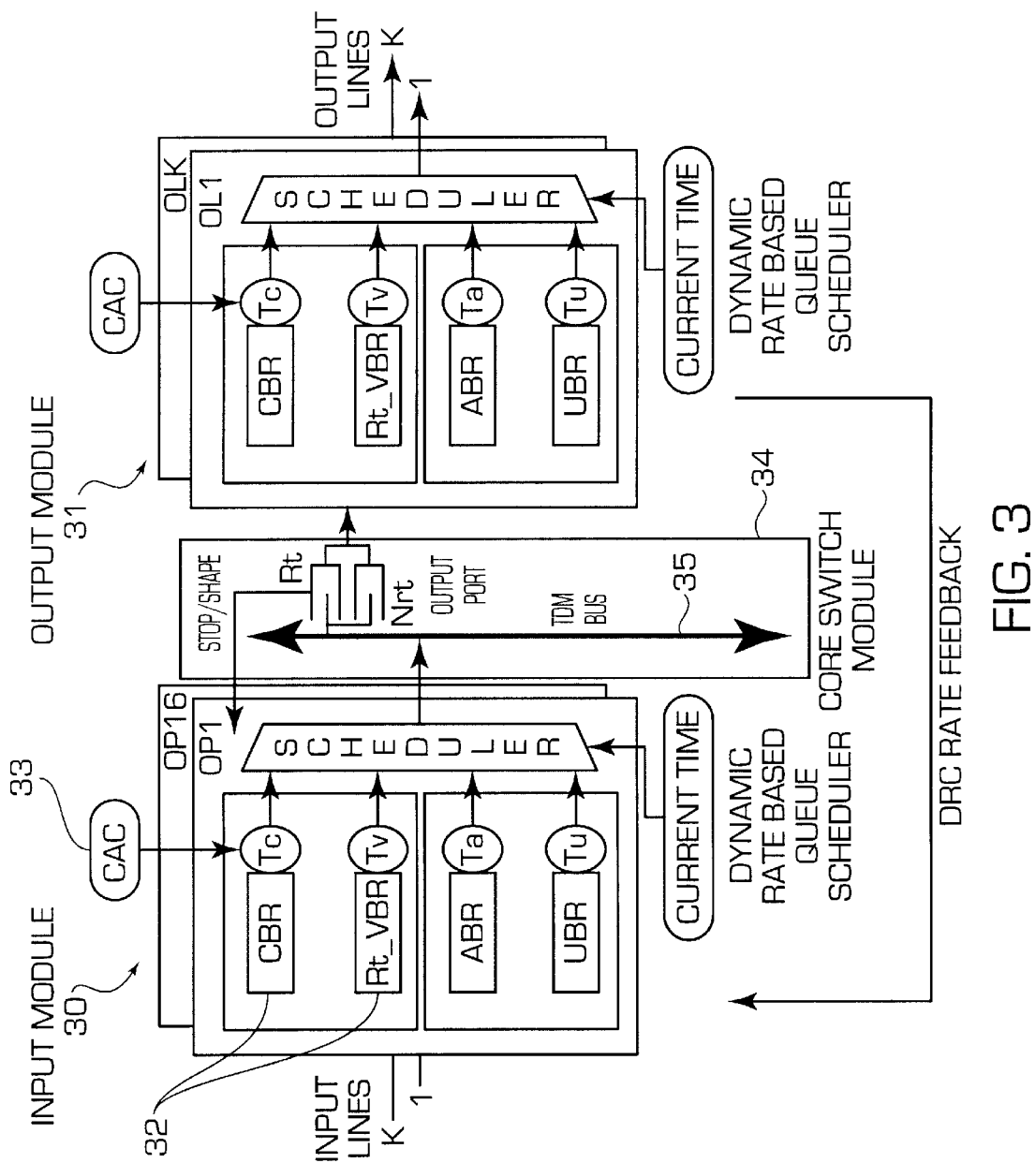
FIG. 3 depicts in more details the structure of the input and output modules according to the preferred embodiment of the present invention.

FIG. 3 exemplifies with more specificity the arrangement of the input and output modules. The input module 30 is depicted as 16 planes corresponding to 16 output ports OP1–OP16. Each of the planes has a plurality (only four shown, but many more may be present) of identical buffers 32. These buffers can be programmed by the CAC 33 to correspond to various classes having respective QoS requirements. In the exemplified input module 30, the four buffers are assigned to CBR, VBR, ABR and UBR, respectively. The CAC 33 also provides the time stamps for the cells in the buffers.

The core switch module 34 includes the TDM bus 35 which is connected to a plurality of buffered output ports i. In the example depicted, each output port has two buffers: real time buffer Rt and non-real time buffer Nrt. The output buffers are connected to the output modules. Each output module is divided into planes OL1–OLk, corresponding to the output lines. These output planes are also provided with a plurality of programmable buffers and a scheduler.

2. Multicasting

A feature of the inventive switch is its ability of efficiently support multicasting alongside unicasting. A unicast connection within the switch originates at an input line to an input module IMi and terminates at an output line at an output module OMi. A multicast connection originates at an input module IMi and may have multiple output line destinations belonging to one or more output modules OMi. The core switch module provides the capability for supporting multicasting among multiple output modules OMi. A cell which is to be multicast to two or more output modules OMi is transmitted from an input module IMi to the multicast output port MOP. The multicast cells are distinguished as either real-time and non-real-time and a single copy of the cell is stored in the corresponding buffer in the multicast output port MOP. Duplication of the cell occurs at the output of the multicast output port MOP, just prior to transmission to the output modules OMi.

As shown in FIG. 1, real-time multicast traffic has the highest priority at the input to each output module OMi. (In FIG. 1, output priority is depicted using the order of the arrows pointing to the vertical line which designates the input to the output module. The top-most arrow designating the highest priority.) In a given cell time, if there is a multicast cell at the head of the multicast output port real-time buffer, the cell will be duplicated and transmitted to the output modules OMi which are involved in the multicast. Note that no duplication of multicast cells occurs over the TDM bus of the core switch module.

Real-time multicast traffic does not suffer any blocking because it has the highest priority. On the other hand, non-real-time multicast traffic has lower priority than real-time multicast and real-time unicast. In a given cell time, a non-real-time multicast cell at an output port OPi will be blocked if there is either a real-time multicast cell at the OPi or a unicast real-time cell in any of the unicast OPis pertaining to the multicast.

3. Feedback Control

Feedback control is utilized to ensure efficient operation of the switch. Since the output port buffers in the core switch module are small, they can quickly overflow. Therefore, two basic feedback mechanisms are used to regulate such overflow. The feedback mechanisms are:

1. A closed-loop feedback control that matches the bottleneck rate and keeps utilization high while keeping the queues small at the output port buffers.
2. A threshold-based rate feedback mechanism that is activated when the output port buffers of the core switch module have the potential to overflow in spite of the first control mechanism.

The first control is achieved by dynamic rate control (DRC) scheduling in the input modules. The second control is built into the core switch module and is regarded as a safety mechanism to quickly control short-term congestion at the output port OPi bottleneck. The core switch module provides a feedback path for broadcasting state information of an output port OPi to all input modules IMi during each cell time. The time for the feedback signal to propagate from an output port to the input modules is a technology-dependent quantity which is denoted herein by $\tau_d$ (cell times)

In the preferred embodiment, the scheduler would distribute any unused bandwidth to the input modules. Consequently, the actual transmission rate from the input modules may surpass the guaranteed minimum rate. However, under certain circumstances, using all the available bandwidth may cause congestion at certain output ports. Therefore, in the preferred embodiment feedback signals are used to alleviate any such congestion.

Preferably, there are three thresholds on the output port buffers which generate control feedback signals: 1) stop RT, 2) shape RT, and 3) stop NRT (see, FIG. 1). The stop RT threshold indicator is set to one when the real-time buffer fill is greater than or equal to the threshold value $Th_{stop}$; otherwise, stop RT is zero. Similarly, stop NRT=1 if the non-real-time queue fill is greater than or equal to $Th_{stop}$. The stop threshold value $Th_{stop}$ is chosen as the largest value such that no buffer overflow occurs under the worst-case assumption that all IMs transmit cells to the same output port until the stop signal reaches the input modules. The shape RT indicator is set to one when the real-time buffer is greater than or equal to the threshold value $Th_{shape} < Th_{stop}$. Table 1 shows how the control signals for an output port are encoded in two bits, $B_1$, $B_0$ and the action to be taken by the input modules.

TABLE 1

Feedback Control Signals.

| Threshold Indicator | | | Control Bits | | Action Taken |
|---|---|---|---|---|---|
| shape Rt | stop RT | stop NRT | $B_1$ | $B_0$ | Input Modules |
| 0 | 0 | 0 | 0 | 0 | Send RT, Stop NRT |
| 0 | 0 | 1 | 0 | 1 | Send RT, Stop NRT |
| 1 | 0 | 0 | 1 | 0 | Shape RT, Send |
| 1 | 1 | 1 | 1 | 1 | NRT Stop RT, Stop NRT |

If stop RT indica:or is set to one, the appropriate feedback signal will be activated. After $\tau_d$ cell times, the signal will reach all input modules and each input module will throttle the flow of cells (both real-time and non-real-time) to the corresponding output port. The stop NRT indicator functions in an analogous way for non-real-time traffic. By means of feedback signals, cell loss at the output port is prevented. Note that the stop signal results in input queueing in the input module. Without the stop signal, cells cannot queue in the input modules; rather, cell loss would occur whenever the output port overflows.

The shape RT indicator provides a means of controlling congestion for real-time traffic based on pre-assigned minimum guaranteed rates for queue flows. When a shape RT signal is received at an input module IMi from a given output port OPj, all real-time queue flows corresponding to the output port OPj are shaped to their minimum guaranteed rates. That is, the real time queues scheduled at their minimum rate irrespective of the amount of unused bandwidth available for distribution. This action prevents the real-time queue fill in the output port OPj from growing further, while ensuring the guaranteed minimum throughput for the real-time queue flows. Thus, a real-time queue flow is served at a rate greater than the minimum guaranteed rate when there is no congestion, and at a rate equal to the minimum guaranteed rate when there is congestion. As will be discussed further below, the DRC scheduler ensures that stop signals for real-time queues flows are activated with only low probability.

3. Traffic Classes and Quality-of-Service Support

3.1 Real-time Traffic

Real-time traffic such as CBR and VBR have strict requirements on cell delay, cell loss, and cell delay variation (CDV). In conjunction with a connection admission control (CAC) algorithm, the large switch architecture can provide QoS guarantees. The CAC developed in G. Ramamurthy and Q. Ren, *Multi-Class Connection Admission Control Policy for High Speed ATM Switches*, in proc. IEEE INFOCOM '97 (Kobe, Japan) April 1997, and incorporated herein by reference, may be used in the inventive switch. This CAC computes the bandwidth required by a real-time queue flow to satisfy the QoS requirements of all connections within the flow. Thus, the CAC takes into account statistical multiplexing of connections within a given queue flow (statistical multiplexing takes into account that the bandwidth required for a collection of streams is less than the sum of the individual bandwidths required for each stream). The required bandwidth is computed based on the UPC values for each connection and a nominal pre-assignment of buffers to the flow. However, it should be noted that in the prior art the calculated minimum rate is used only for CAC purposes and is not sent to the scheduler.

The DRC scheduling mechanism ensures that each queue flow receives its minimum guaranteed rate and hence the QoS is guaranteed for all connections within the flow. The minimum rate is guaranteed on a short time-scale because real-time traffic has strict priority over non-real-time traffic in the core switch element, and shape feedback mechanism from the output ports ensures that queue flows receive their minimum guaranteed rates even under congestion conditions. That is, under congestion conditions the shape feedback mechanism halts distribution of any unused bandwidth, thereby reducing the rates to the minimum guaranteed rates to alleviate the congestion while ensuring the minimum guaranteed rate. Further, queues forced to operate at minimum rate (in shape mode) have their priority bit set when they become eligible for service.

3.2 Non-real-time Traffic

The two main traffic classes targeted as non-real-time are ABR and UBR. These classes generally do not have strict QoS requirements, but they may have minimum throughput requirements. The minimum rate for a non-real-time queue flow is just the sum of the minimum throughput over all connections within the flow. The large switch scheduler is able to guarantee the minimum rate for each non-real-time flow via DRC scheduling. Any unused bandwidth at a switch bottleneck is distributed among competing queue flows (both real-time and non-real-time). The distribution of unused bandwidth depends on the weights $\omega_i$ assigned to the different traffic classes. Preferably, these rates are assigned dynamically.

UBR sources are not rate-controlled and can cause loss of throughput in conventional switch architectures. With dynamic rate control, UBR queues receive their minimum rates plus a fair share of the unused bandwidth. ABR sources are rate-controlled via a closed-loop feedback mechanism. At the switch, an explicit rate (ER) value is computed at each bottleneck point in the connection flow. In the large switch architecture, an ABR ER value is computed at the output ports bottleneck and at the output line bottleneck in the output modules. Various methods may be used to compute the ER; however, in the preferred embodiment the ABR ER values are computed in a similar manner to the computation of the DRC rates.

4. Dynamic Rate Control

Dynamic rate control (DRC) is the mechanism for cell scheduling used in the large capacity switch. For a full understanding of DRC, reference should be made to the related U.S. appln. Ser. No. 08/924,820, however, for the reader's convenience a summary of DRC basic principles, as applied to the inventive switch, is provided hereinbelow. The reader may also wish to review A. Kolarov and G. Ramamurthy, Design of a Closed Loop Feed Back Control for ABR Service, in proc. IEEE INFOCOM '97 (Kobe, Japan) April 1997, which describes a feedback control for ABR service as applied to an ATM network. It should be kept in mind, however, that in the following description the feedback is applied over the ATM switch.

The basic principle is that each class queue is treated like a virtual source whose service rate is dynamically adjusted to reflect the unused bandwidth available at a bottleneck point in the switch. Specifically, each class is serviced at its guaranteed minimum rate plus a dynamically adjusted fair share of any available unused bandwidth. Scheduling consists of computing the queue service rate and implementing the rate shaping function for all queues. An important feature of this approach to scheduling is that all queues are reduced to a generic set of queues, and the QoS perceived by the class is determined by the bandwidth guaranteed for the class. The generic queues are assigned to classes by the CAC.

4.1 Guaranteed Minimum Rate

In order to provide QoS for a given connection at a switch, there must be a mapping between the traffic characteristics and the bandwidth resources at a switch. For a given connection i, the traffic specification may comprise a set of QoS requirements in terms of cell loss probability, delay, and/or delay jitter. Rather than implementing an algorithm which account for all of the specified requirements, it is simpler to map the requirements into a single variable which would accounts for all the requirements. In the preferred embodiment of DRC, the requirements are mapped onto a bandwidth or rate, $M_i$, such that if connection i receives the rate $M_i$, then its QoS requirements will be met. Preferably, $M_i$ would be provided by the Connection Admission Control (CAC) algorithm. The rate $M_i$ should be approximated to a sufficient degree of accuracy so as to incorporate all the QoS requirements.

Once $M_i$ is determined, the scheduler ensures that connection i receives its minimum rate. This in turn ensures that connection i will be guaranteed its QoS. Thus, the scheduler is simplified by having to account for only a single variable.

Consider a concentration point in the network where N connections are multiplexed onto a link of capacity C. Clearly, we must have $$\sum_{i=1}^{N} M_i \leq C$$

Using a simple First-In First-Out (FIFO) scheduler provides no way of guaranteeing that each connection gets its assigned share, $M_i$, of the bandwidth. For example, a given connection may transmit at a rate higher than its assigned share $M_i$, and thereby take away bandwidth from another connection.

Figure 4:
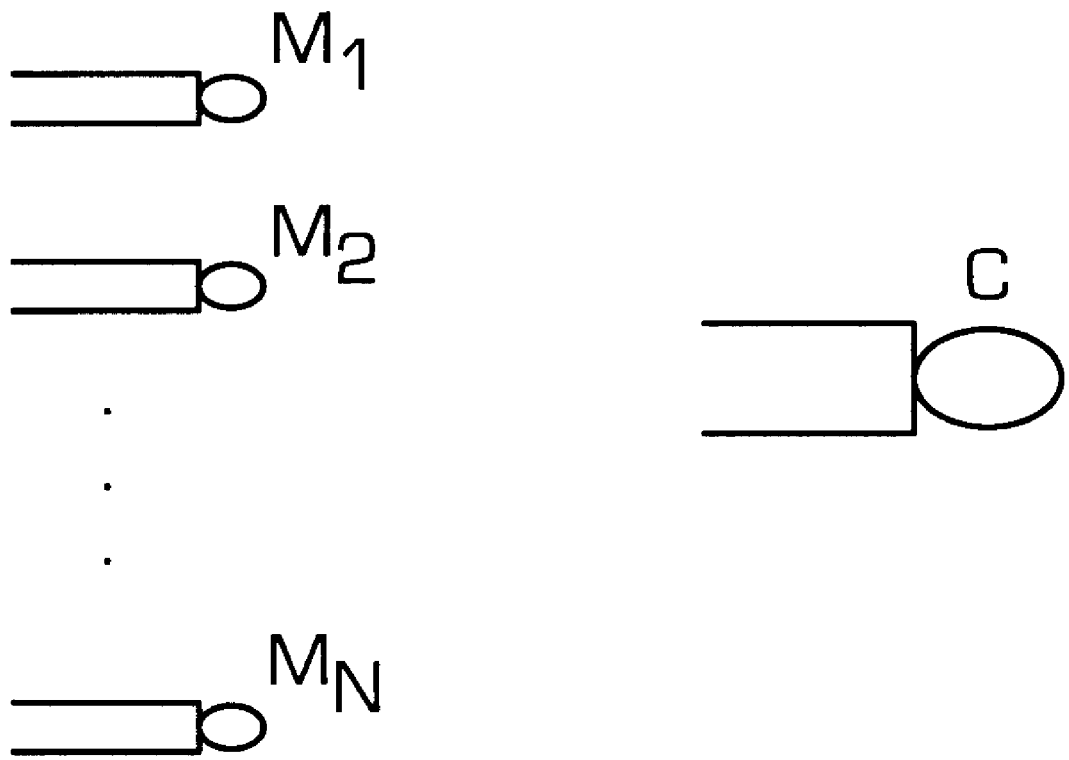
FIG. 4 exemplifies a scheduler with minimum rate shaping.

A simple way to ensure that no connection uses more bandwidth than its assigned share is to limit the peak rate of each connection i to $M_i$. This can be done, for example, by shaping the peak rate of each connection to its assigned minimum rate using known methods, such as leaky buckets. FIG. 4 shows N queues with each queue i shaped to a respective rate $M_i$, i=1, . . . , N. The shaped traffic streams are then multiplexed and served in FIFO order at a rate equal to or below the downstream buffer's rate C.

Peak rate enforcement ensures that minimum rate guarantees are satisfied for all connections. Under this scheduling discipline, however, connection i can never use more bandwidth than its assigned $M_i$, even when bandwidth is available. For example, if connection i is the only active connection sharing the link bandwidth C, it will be limited to using bandwidth $M_i$, even though the entire link capacity C is available. Moreover, if the minimum rate $M_i$ is computed assuming that statistical multiplexing takes place, the QoS of connection i is guaranteed assuming sharing of the overall bandwidth since the link capacity may be exceeded with small probability. This type of sharing cannot occur if the connection peak rates are limited to the values $M_i$. The assigned bandwidth $M_i$, computed under the assumption of statistical multiplexing gain, may be insufficient to guarantee QoS when no statistical multiplexing takes place.

The rate control mechanism employed in the static rate-based schedulers may be termed open-loop. A consequence of this is that the scheduler is non-work conserving; i.e., a cell time on the output link may is be idle even when there may be cells to serve in the system. Thus, it is possible that available bandwidth can be wasted in these scheduling disciplines. The DRC scheduler remedies this problem via a closed-loop control mechanism.

Figure 5:
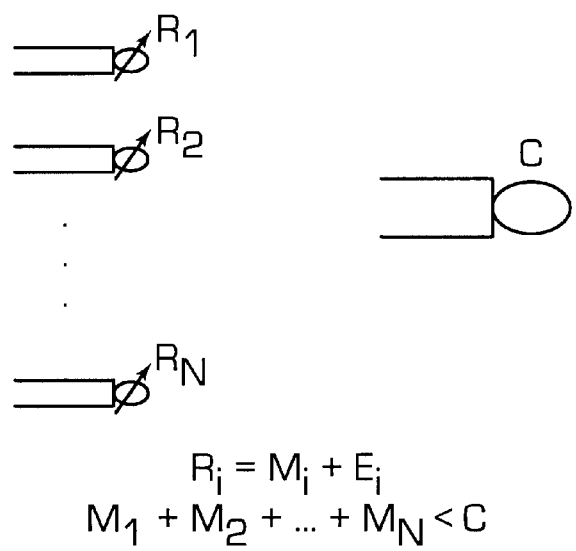
FIG. 5 exemplifies a scheduler implementing the inventive DRC scheduling.

The basic principle of the DRC scheduler is illustrated in FIG. 5. As before, each traffic stream is peak-rate shaped before entering a common FIFO queue served at the link rate C. However, the shaping rates $R_i$ are dynamically computed to reflect the amount of bandwidth available on the link. Specifically, connection i is peak-rate shaped to $R_i$, where $$R_i = M_i + w_1 E,$$

and E is the estimated unused bandwidth at the bottleneck point (also referred to herein as the excess rate or excess bandwidth), and $w_i \geq 0$ is an optional weighting factor which may be assigned statically or dynamically. Since, $E \geq 0$, we have $R_i \geq M_i$. Thus, connection i is guaranteed the minimum rate $M_1$, but may transmit at a higher rate when unused bandwidth is available. Conversely, during congestion the scheduler may drive E to zero, thereby serving the queue only at their guaranteed minimum rate until congestion is relieved.

4.2 Closed-loop Rate Control

Figure 6:
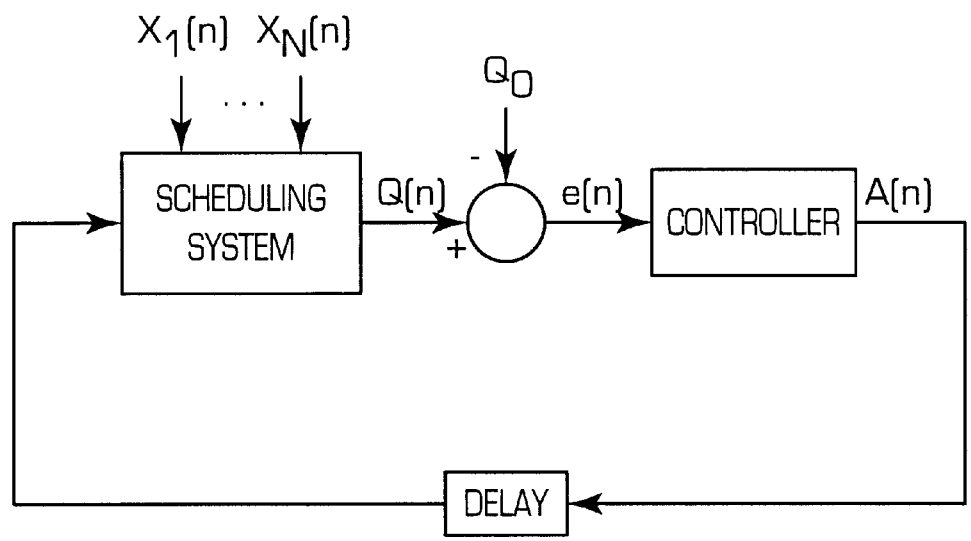
FIG. 6 depicts a close-loop rate control.

FIG. 6 depicts a closed-loop rate control system which detects the available bandwidth to be distributed among connections in the DRC scheduler. Assume that time is discretized into intervals of length T. Let $X_i(n)$ denote the number of cells generated by connection i in the nth time interval. The quantity Q(n) represents the number of cells in the second-stage buffer. In the first stage, each connection stream is shaped according to the rate $$R_i(n) = \min(M_i + w_i E(n), C).$$

The controller computes E(n) such that Q(n) is kept close to the target queue threshold $Q_0$. In equilibrium, the aggregate flow rate to the second stage should match the link capacity (provided there is sufficient source flow).

Formulated in this way, the computation of E(n) becomes a control problem. This somewhat resembles the problem of computing an explicit rate (ER) for ABR service, as disclosed in the above noted ABR paper by Kolarov and Ramamurthy. However, the implementation of the ER within the switch is simplified. For the purposes of the ERC scheduler, a single controller is sufficient. Since the rate control occurs locally within the switch, the feedback delay (see FIG. 6) is small relative to the sampling interval T. This delay is negligible, in contrast to flow control in ABR, where feedback delays must be taken into account. Thus, while the control disclosed in the Kolarov and Ramamurthy paper can be implemented only for non-real-time ABR service, the present control can be implemented for real time and non-real time services.

To simplify the design of the controller, suppose that there is a single source at stage one with infinite backlog (i.e., it can always fill any available link capacity). Let E(n) denote the rate computed by the controller at time n. In this case, R(n) is also the flow rate from stage one to stage two for the single source. Let $\epsilon(n) = Q(n) - Q_0$ denote the error between the queue length at time n and the target queue length $Q_0$. The general form of the discrete-time PD controller is as follows:

$$E(n+1) = E(n) - \alpha_0 \epsilon(n) \alpha_1 \epsilon(n-1) - \ldots - \alpha_u \epsilon(n-u) - \beta_0 E(n) - \beta_1 E(n-1) - \ldots - \beta_v E(n-v), \quad (1)$$

where $\alpha_i$, i=1, . . . u and $\beta_i$, i=1, . . . , v are real-valued coefficients. For the DRC scheduler, it is preferable to use a simple two-parameter filter:

$$E(n+1) = E(n) - \alpha_0 \epsilon(n) - \alpha_1 \epsilon(n-1) \quad (2)$$

Thus, the controller is simplified, allowing for speed up of rate shaping.

4.3 Overload Control

The closed-loop controller adjusts the rate E(n) such that the error $\epsilon(n) = Q(n) - Q_0$ decreases in absolute value. However, the dynamics of the aggregate input traffic R(n) may be faster than that of the closed-loop controller. The queue length, Q(n), in the second stage may grow to a large value before the closed-loop controller can bring it close to the target value $Q_0$. This is caused by connections which transmit at rates significantly larger than their minimum guaranteed rates $M_i$. A large value of Q(n) can adversely affect the delay performance of connections which are transmitting at rates close to their minimum rates. Since the response time of the closed-loop controller may be too slow to prevent overload at the second stage of the scheduler, in the preferred embodiment a separate overload control mechanism is provided.

When the second stage buffer exceeds a certain shape threshold, a feedback shape signal is transmitted to the DRC scheduler. This shape signal causes the scheduler to shape all queues at their guaranteed minimum rates, $M_i$, and stop distribution of unused bandwidth. This action provides a quick overload control mechanism allowing relief of congestion. Unlike the prior art backpressure signal, the novel shape signal has the important property of allowing the queues to transmit at their guaranteed minimum rates in the presence of congestion. Still, a stop backpressure signal which forces all queues to stop all cell transmission to the second stage queue may also be used.

More specifically, in the prior art the simple stop/go backpressure control mechanism results in an equalization of throughput for all queues; i.e., each queue will achieve a throughput of C/N. Moreover, the frequent occurrence of stop/go signals introduces cell delay variation (CDV) which can adversely affect the QoS experienced by real-time connections. Therefore, in the preferred embodiment two signals are used: shape signal and stop signal. The shape signal threshold is set lower than the stop signal threshold, and allows relief of congestion while permitting transmission at the guaranteed minimum rate. The stop signal threshold is set very high so that, because of the use of shape signal, the stop signal would be activated very rarely. That is, the stop signal would serve as a last resort pressure relief valve.

4.4 DRC Scheduling for the Large Switch
4.4.1 Single-loop Feedback

In the input modules of FIG. 2b, cells are buffered in queues according to traffic class and destination output port of the core switch module (hereinafter such an arrangement is designated as class/OP queue). Let (i,j,l) denote the queue corresponding to class i and destination output port j in input module l (when the input module is obvious by context, we will sometimes use the abbreviated notation (i,j) to refer to a particular queue within the input module). Each class/OP queue is regarded as a virtual source whose flow rate can be controlled. The connection admission control (CAC) algorithm provides the switch with a guaranteed minimum service rate for each queue. The value of this minimum rate is determined by the QoS objective of the class, the number of admitted connections and their traffic characteristics. Let $M_{ijl}$ denote the guaranteed minimum service rate for queue (i,j,l). The input module scheduler must ensure that each input module queue achieves a throughput greater than or equal to the guaranteed minimum rate. For real-time traffic, the throughput guarantee must be provided on a relatively fast time-scale. While non-real-time traffic must also receive the minimum guaranteed throughput, the guarantee can be provided on a slower time-scale.

The sum of the minimum rates must not exceed the line capacity at each output port and at each input module; i.e., $$\sum_{i,l} M_{ijl} \leq C,$$

for each OP j and $$\sum_{i,j} M_{ijl} \leq C$$

for each IM l. The rate guarantees can be satisfied by statically rate shaping the queue flows, according to the minimum rates. However, as explained above, under a static scheduling discipline a queue can never transmit at a rate higher than its assigned minimum rate, even if bandwidth is available at the output port bottleneck. The static discipline is non-work conserving with respect to the output port bottleneck (i.e., a cell time at an output port may be left idle even when there is an input module queue with cells to send) and there is no statistical multiplexing between queue flows. Note that statistical multiplexing does occur between connection flows within a queue flow.

To achieve statistical multiplexing between queue flows, it is preferable to use the dynamic rate control (DRC) scheduling. At output port j, which is a potential bottleneck, an excess rate $E_j$ is computed based on the traffic utilization at the output port and queue length information at all input module queues corresponding to destination $OP_j$. The method for computing $E_j$ will be discussed in section 6 below. A dynamic rate, $R_{ijl}$, is assigned to queue (i,j,l) according to:

$$R_{ijl}=M_{ijl}+w_i N_{ijl} E_j,$$

where $w_i$ is a pre-assigned weighting factor associated with class i and $N_{ijl}$ represents the number of active connections associated with queue (i,j,l). For real-time connections, $N_{ijl}$ is simply the number of connections assigned to queue (i,j,l).

For non-real-time connections, $N_{ijl}$ is computed as an estimate of the number of active connections assigned to queue (i,j,l), since some actual connections may sit idle. The value of $w_i$ is a policy decision made by the multiclass CAC. Thus, the rate $R_{ijl}$ consists of a static part determined by the CAC, $M_{ijl}$, and a dynamic part $w_i N_{ijl} E_j$. The static part provides the minimum rate guarantee, while the dynamic part allows queue flows to utilize any unused bandwidth at the output port bottleneck in a fair manner (determined by the weights $w_i$) and without overloading the bottleneck.

DRC scheduling is also applied analogously to the output module queue schedulers. In the output modules, cells are queued according to traffic class and output line. Using similar notation to that introduced earlier for input module scheduling, let (i,j,l) denote the queue corresponding to class i and destination output line j in output module $OM_1$. The dynamic rate, $\tilde{R}_{ijl}$, assigned to queue (i,j,l) in OM1 is determined according to $$\tilde{R}_{ijl}=\tilde{M}_{ijl}+w_i \tilde{N}_{ijl} \tilde{E}_{jl},$$

where $\tilde{M}_{ijl}$ is the minimum guaranteed rate for queue (i,j,l), $\tilde{N}_{ijl}$ is the number of active connections assigned to queue (i,j,l), and $\tilde{E}_{jl}$ is the DRC rate for line j in $OM_l$.

4.4.2 Dual-loop Feedback

In section 4.4.1, the DRC rate $E_j$ is computed based on the bottleneck at output port $OP_j$ and used in the computation of rates $R_{ijl}$ as discussed above. A second bottleneck is at the output line of the output module due to rate mismatch. If an output line gets overloaded, queues in the output module can grow, leading to cell loss and underutilization. This problem can be alleviated by queueing cells at the input module according to output line within an output module, as exemplified in FIG. 2c. More precisely, let (i,j,k,l) denote a queue in an input module corresponding to class i, destination output module j, destination output line k (within output module j), and input module l. The notation (i,j,k) represents a queue of class i in destination $OM_j$ and output line k. In this scheme, the number of queues in the input module increases by a factor of L, where L is the number of output lines per output module. We shall briefly discuss how DRC can further improve switch performance in this case via the addition of a second feedback loop from the input module to the output line bottleneck.

In the second feedback loop, a rate, $E_{jk}$ is computed based on the number of cells queued at output line k in $OM_j$. That is, $E_{ijk}$ represents the free bandwidth available at the bottleneck corresponding to output line k in output module j. The rates $E_{ijk}$ can be conveyed to all IMs and used to compute the dynamic rate, $R_{ijkl}$, for queue (i,j,k,l) as follows:

$$R_{ijl}=M_{ijkl}+w_i \min\{E_j, E_{jk}\},$$

where $M_{ijkl}$ denotes the Guaranteed minimum rate for queue (i,j,k,l). By computing the dynamic rate in this way, both the bottleneck at output module j and output line k (in output module j) are rate matched.

In effect, the dynamic rates controlling the IM queues are computed based on two feedback loops: the first extending to a given output module and the second extending to a given output line within the output module. This keeps the queues in the output module small, while maintaining high utilization. Thus, most of the cell queueing is moved to the input module in a controlled manner by the DRC mechanism.

5. Design of the Scheduler
5.1 Rate-based Scheduling

In each cell time, the IM scheduler determines the next queue from which a cell can be transmitted to its destination OP. In the DRC scheme, the scheduling is based on the values of dynamically computed rates for each queue. Given these dynamic rates, the IM implements a two-stage algorithm to determine the next queue to serve:

Stage one: Virtual rate shaping

Stage two: Service scheduling

Virtual rate shaping and service scheduling are discussed in detail in subsections 5.2 and 5.3, respectively.

We shall identify a queue with the notation (i,j), standing for class i (i=0, . . . ,7) and destination $OP_j$ (j=0, . . . ,15). Associated with queue (i,j) are the following quantities:

$TS_{ij}$: timestamp. This is stored in a 20-bit register with a 12-bit integer part and an 8-bit fractional part. The timestamp is updated whenever the queue is scheduled or rescheduled for service. $TS_{ij}$ is initialized to zero.

$AQ_{ij}$: actual queue size. This is the number of cells stored in queue (i,j). $AQ_{ij}$ is incremented whenever a cell arrives to queue (i,j) and is decremented whenever the scheduler chooses queue i to be served in a given cell time. $AQ_{ij}$ is stored in a 16-bit register and is initialized to zero.

$VQ_{ij}$: virtual queue size. This is the number of cells stored in the virtual queue for queue (i,j) $VQ_{ij}$ is stored in an 8-bit register and is initialized to zero. In the preferred embodiment, $VQ_{ij}$ is never incremented beyond 255.

$WF_{ij}$: wraparound flag. This is a two-bit flag which indicates the cycle of the current clock. It is initialized to one.

$M_{ij}$: minimum guaranteed rate. This quantity is provided by the CAC and is stored as an interval, $IM_{ij}$.

$J_{ij}$: interval for minimum guaranteed rate.

This is the inverse of the minimum guaranteed rate, $M_{ij}$, for queue (i,j), stored as a 20-bit number in memory with a 12-bit integer part and an 8-bit fractional part.

$E_j$: DRC rate. The DRC rate is computed at OP j based on the global virtual queue for OP j. This value is not stored in the IM.

$w_i$: weighting factor for class i. This is 8-bit integer used in the computation of the shaping rate $R_{ij}$.

$R_{ij}$: computed shaping rate. This is the rate computed by the DRC algorithm for shaping the traffic of queue (i,j). Its value is stored in the form of an interval, $I_{ij}$.

$I_{ij}$: interval for computed rate. This is the inverse of the rate, $R_{ij}$, computed by the DRC algorithm for queue (i,j).

$P_{ij}$: scheduling priority. This is a one-bit flag. $P_{ij}=1$ indicates that queue (i,j) has priority for finding the next cell to schedule to the virtual queue.

$PV_{ij}$: service priority from virtual queue. This is a one-bit flag. $PV_{ij}=1$ indicates that queue (i,j) has priority for finding the next cell to service (transmit to OP) from the virtual queue.

$S_{ij}$: shape signal. When this signal is set, queue (i,j) is to be scheduled at the MCR rate. The signal $S_{ij}$ is set equal to one under the following conditions:

1. Queue (i,j) is of type RT and the shape RT signal is set to one.
2. Queue (i,j) is of type RT and local VQ count exceeds a threshold: $\Sigma_{i,j} VQ_{ij} \geq Th_{VQ}$.
3. The product $N_{ij} \times W_i \times E_j = 0$.

Note that NRT traffic is shaped only in case 3.

$N_{ij}$: number of active VCs. For RT queues, this number is simply the number of VCs as recorded by the CAC, since they are all presumed active. For NRT queues which may idle for long periods (i.e., UBR and ABR), the number of active NRT queues is estimated via a counting mechanism to be described in Subsection 5.5.

It should be noted that although in the above described preferred embodiment the timestamps are assigned per queues, it is also possible to perform rate shaping by assigning timestamps per cell. In such an embodiment, all cells having timestamps equal or less than the current time CT would be eligible for service.

Current Time and Wraparound

In each IM there is a 12-bit counter CT which stores the current time, where each time tick is one cell time at 2.4 Gbps. i.e., 175 ns. One cycle is defined as $2^{12}$ cell times, or the time it takes until CT wraps around, starting from CT=0. Whenever CT wraps around, the $WF_j$ flag for each queue (i,j) is incremented by one if $WF_{ij} < 3$. This operation can be done in a single cell time. Together, the timestamp $TS_{ij}$ and the flag $WF_{ij}$ indicate the value of time maintained for queue (i,j) with respect to the current time. The meanings of the four possible values of WF are summarized in the Table 2.

TABLE 2

| | Values for $WF_{ij}$ |
|---|---|
| $WF_{ij}$ | Meaning: $TS_{ij}$ is . . . |
| 0 | one cycle ahead of CT |
| 1 | in same cycle as CT |
| 2 | one cycle behind CT |
| 3 | at least two cycles behind CT |

The value of $TS_{ij}$, together with $WF_{ij}$ makes it possible to determine the relative values of the queue timestamp and the current time even when wraparound occurs.

5.2 Virtual Rate Shaping

Virtual rate shaping is based on a timestamp, $TS_{ij}$, assigned to each queue (i,j). The timestamp $TS_{ij}$ is updated such that the flow rate of queue (i,j) is limited to either $R_{ij}$ or $M_{ij}$. The dynamic rate $R_{ij}$ is used in the timestamp computation if no congestion conditions occur (see below); otherwise the minimum rate $M_{ij}$ is used. If the minimum rate is used in the timestamp computation for queue (i,j), then the priority bit $P_{ij}$ is set to one.

Any queue with a timestamp which is less than or equal to the current time is considered eligible. The current time is a free-running clock in which the interval between clock ticks is equal to one cell time. During each cell time, the IM scheduler selects the next eligible queue with priority given to queues (i,j) which have the priority bit $P_{ij}$ set to one. Once an eligible queue, say queue (i,j), is selected, the virtual queue counter $VQ_{ij}$ is incremented by one. The virtual queue counter counts the number of cells that are eligible for a queue but have not yet been transmitted. Let $AQ_{ij}$ denote the number of cells in queue (i,j). If there are still cells in the active queue which have not been scheduled in the virtual queue, i.e., if $AQ_{ij} > VQ_{ij}$, then the timestamp $TS_{ij}$ is updated to reflect when the next cell in the actual queue should be scheduled. The timestamp is also updated when a cell arrives to an empty queue (i,j)

The scheduling algorithm sets the priority bit $P_{ij}$ under two conditions:

1. The timestamp $TS_{ij}$ has fallen behind the current time by more than $1/M_{ij}$.
2. It is necessary to shape the queue flow at the minimum guaranteed rate, $M_{ij}$, in order to control congestion at $OP_j$.

Case 1 occurs because the local IM scheduler is unable to keep up with the traffic and the computed shaping rates.

Since it takes time for the rate computations to converge to the appropriate rate, it may happen that the instantaneous sum of shaping rates at the IM scheduler may exceed the line rate C, i.e., $$\sum_{ij} R_{ij} > C.$$

If this condition occurs, multiple queues may become eligible in the same cell time.

In case 2, the queue is scheduled under shape mode, i.e., the queue service rate changes from $R_{ij}$ to $M_{ij}$. Shape mode is invoked under the following conditions:

1. The queue is real-time and either a shape or stop signal from the OP is in effect.
2. The queue is real-time and the local sum of VQ counts for the destination OP exceeds a threshold.
3. The computed dynamic rate R equals the minimum rate M.

The first two conditions indicate the occurrence of congestion for real-time traffic at an output port. Switching to shape mode quickly alleviates such congestion, while maintaining the minimum rate guarantee. Giving priority to queues operating in the shape mode ensures that their minimum rates will be guaranteed. When an eligible queue (i,j) is selected by the stage one scheduler, its virtual queue counter $VQ_{ij}$ is incremented by one. If the priority bit $P_{ij}$ is set to one, then the stage two priority bit $PV_{ij}$ is set to one.

When a cell arrives to an empty queue (i,j), the queue becomes eligible for service and the timestamp $TS_{ij}$ must be recomputed to reflect when the queue should next be served. This process is called scheduling. After the stage one scheduler chooses a queue (i,j), the virtual queue counter $VQ_{ij}$ is incremented by one. If there are still cells in the active queue which have not been scheduled in the virtual queue, i.e., if $AQ_{ij} > VQ_{ij}$, then the timestamp $TS_{ij}$ should be updated to reflect when the next cell in the actual queue should be scheduled. This process is called rescheduling.

Scheduling

Figure 7:
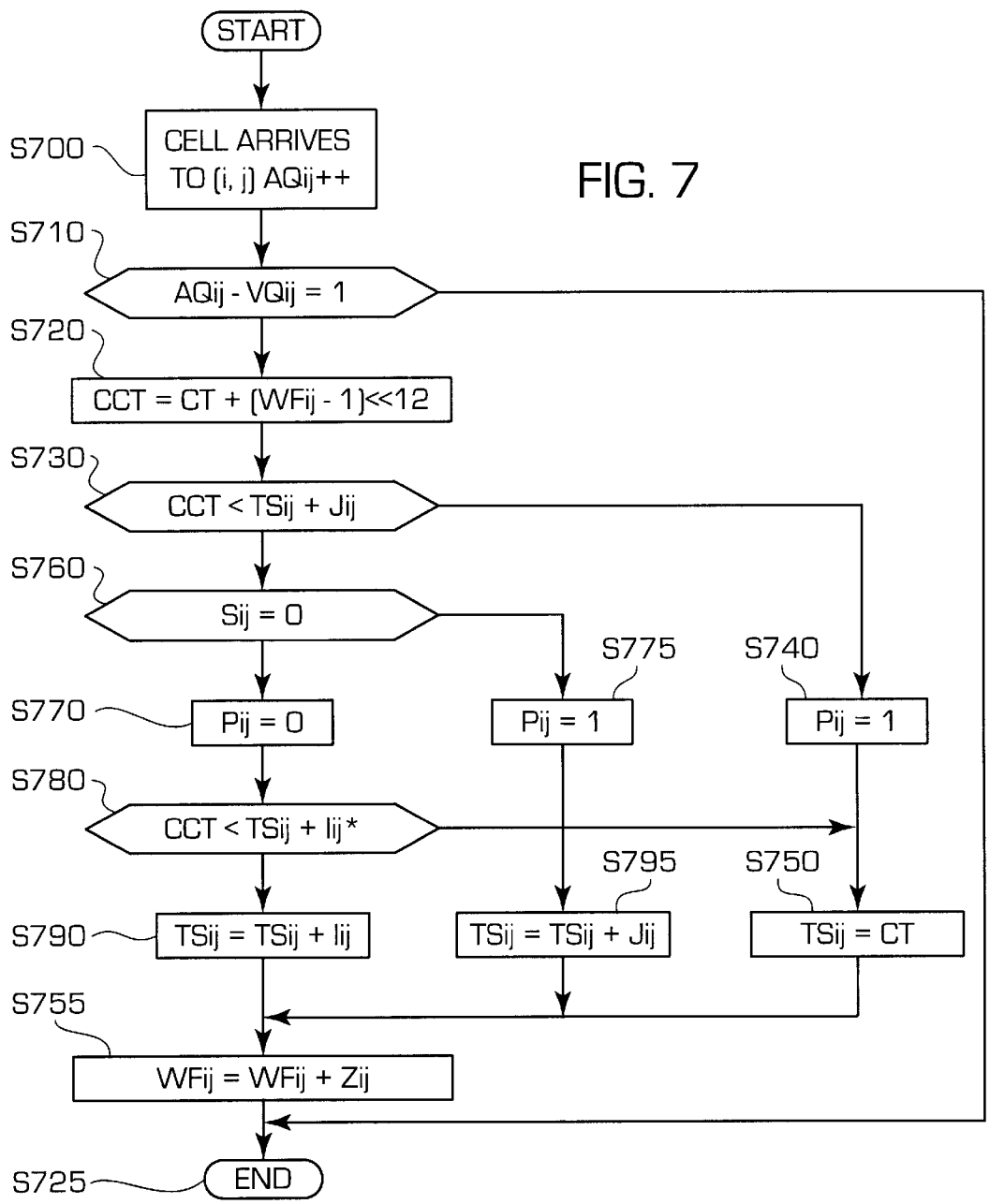
FIG. 7 is a flow diagram of the algorithm for scheduling cells according to timestamps.

The algorithm for scheduling is depicted in FIG. 7 in flow chart form. In step S700, when a cell arrives at queue (i,j), the counter $AQ_{ij}$ is incremented by one (the notation ++ is used to indicate an increment by one). In step S710, it is checked whether $AQ_{ij} - VQ_{ij} = 1$. If so, then the queue is eligible to be scheduled and the process continues to step S720. Otherwise, the routine terminates at step S725.

The variable CCT is a 14-bit integer variable which stores the value of the current time relative to the timestamp $TS_{ij}$. Note that $WF_{ij}$ is initialized to one. Referring to Table 2, observe that if $AQ_{ij} - VQ_{ij} = 1$ then necessarily $WF_{ij} \geq 1$. In step S720 CCT is computed as $$CCT = CT + (WF_{ij} - 1) << 12,$$

where << denotes the binary shift left operation (i.e., multiplication by $2^{12}$).

The next step in the scheduling algorithm is to compare CCT with the 13-bit integer $TS_{ij} + IM^{ij"}$. In step S730 if the condition $$CCT < TS_{ij} + J_{ij}"$$  (3)

is false, then queue (i,j) is considered to be running late, i.e., it is behind the current time by at least one interval at the minimum guaranteed rate $(J_{ij})$ Hence, the routine proceeds to step S740 wherein the priority bit $P_{ij}$ is set to one, since the queue traffic is conforming to its minimum guaranteed rate. Then, in step S750 queue (i,j) is scheduled at the current time CT, i.e., $TS_{ij} = CT$.

However, if (3) is true in step S730, the routine would proceed to step S760 to check on the value of $S_{ij}$. The queue will be scheduled at either the minimum guaranteed rate, $M_{ij}$, or the computed rate, $R_{ij}$, depending on the value of $S_{ij}$. If in step S760 $S_{ij} = 0$, i.e., the OP is not overloaded, then queue (i,j) is scheduled at the computed rate, $R_{ij}$, with priority $P_{ij} = 0$ in step 770. In this case, if the condition $$CCT < TS_{ij} + I_{ij}"$$  (4)

is false in step S780, the routine proceeds to step S750 and the queue is scheduled at the current time CT. Otherwise, the timestamp is updated at step S790 as $$TS_{ij} = TS_{ij} + I_{ij}.$$

If $S_{ij} = 1$ in step S730, i.e., the OP is overloaded, then queue (i,j) is to be shaped to the minimum guaranteed rate and given priority $P_{ij} = 1$ (step 775). In this case, in step S795 the timestamp is updated according to $$TS_{ij} = TS_{ij} + J_{ij}.$$

Also, the wraparound flag $WF_{ij}$ may need to be adjusted appropriately in step S755.

Rescheduling

Figure 8:
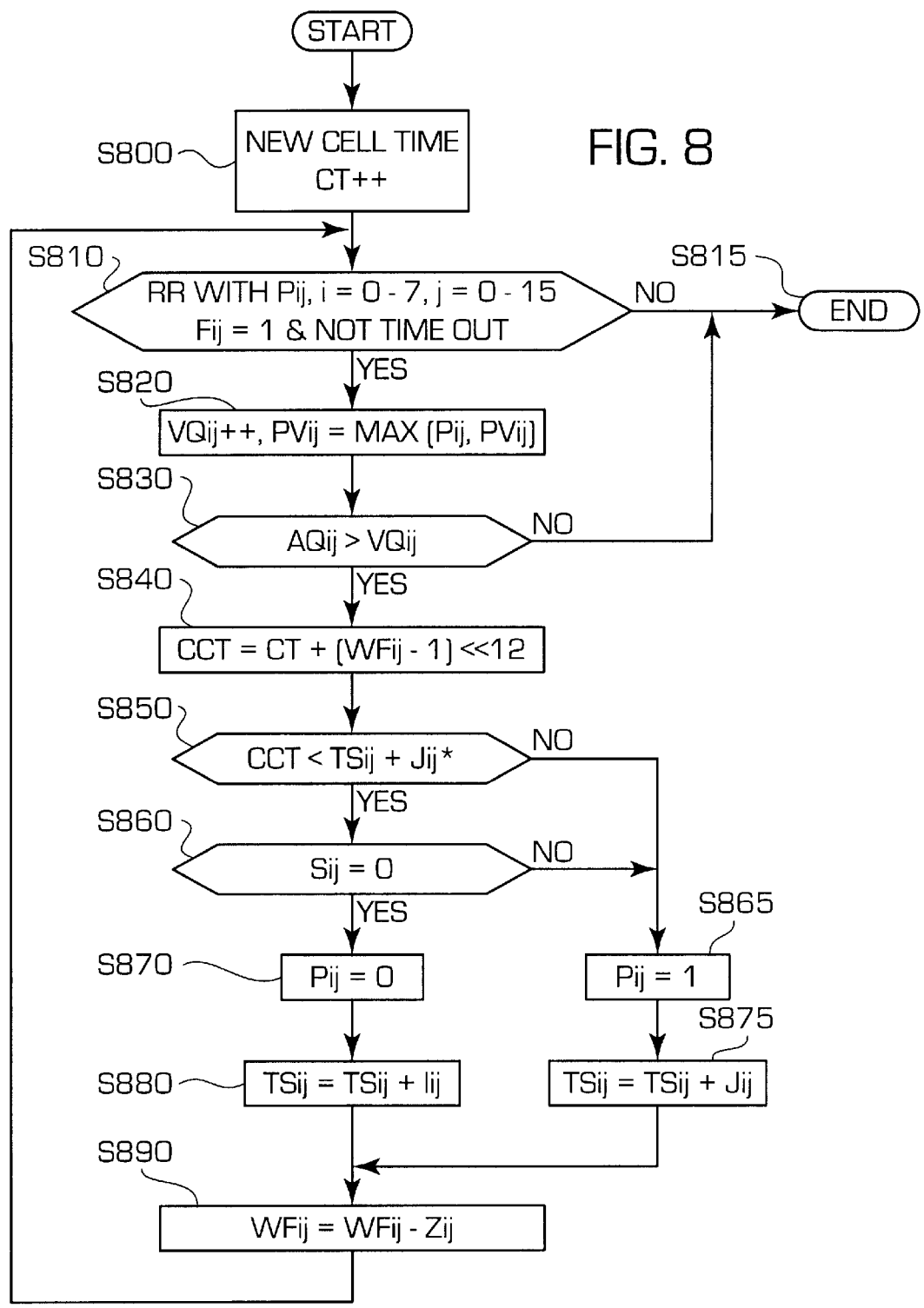
FIG. 8 is a flow diagram of the algorithm for rescheduling of cells according to timestamps.

The rescheduling algorithm is shown in FIG. 8. The algorithm attempts to serve and (if necessary) to reschedule queues which have past their conformance times with respect to the current time CT. In this context, to serve queue (i,j) means to increment its virtual queue counter $VQ_{ij}$ by one. The algorithm performs a round-robin search of the queues (i,j) with priority given to queues with $P_{ij} = 1$, iterating over the class i=0, . . . ,7 and then the destination OP j=0, . . . ,15. While not shown in FIG. 8, This can be done in two passes. The first pass attempts to find a queue (i,j) with $F_{ij} = 1$ and the priority bit set, i.e., $P_{ij} = 1$. If the first pass fails, then a second pass is executed to find a queue with $F_{ij} = 1$. The rescheduling algorithm is run until either all queues have been examined or a time-out occurs, indicating the end of the current cell time.

The condition $F_{ij} = 1$ is true if and only if the following hold:

1. $AQ_{ij} > VQ_{ij}$. This means that there is at least one cell in the actual queue which has not been scheduled in the virtual queue.
2. $VQ_{ij} <$ FF (hex). The counter $VQ_{ij}$ is an 8-bit counter which stops incrementing when $VQ_{ij} =$ FF (hex). Therefore, a maximum of 256 cells can be scheduled in a virtual queue. If this limit is reached, then the queue must be bypassed for rescheduling; the virtual queue counter cannot be incremented beyond 255. Note that if the limit of the virtual queue counter is set to 1, this in effect disables the virtual queue. The scheduler will still perform rate shaping, but the rate computation must not be based on the global virtual queue size.
3. $WF_{ij} \geq 2$ or ($WF_{ij} = 1$ and $TS_{ij} \geq CT$). If this condition is true, then queue (i,j) has passed its conformance time; i.e., $TS_{ij}$ represents a point in time which is earlier than the current time as recorded in CT.

If an eligible queue (i,j) is found in the round-robin loop, the next action is to increment $VQ_{ij}$ by one (S820). The virtual queue priority bit is updated according to (S820):

$$PV_{ij} = \max(P_{ij}, PV_{ij}).$$

Thus, $PV_{ij}$ is set to one if either it was already set to one or $P_{ij}$ is set.

Next, if $AQ_{ij} > VQ_{ij}$ (S830), the queue needs to be rescheduled (S840). Otherwise, no rescheduling is necessary (S815). In the rescheduling step, a temporary variable, CCT, is computed as in the scheduling algorithm (cf. FIG. 7):

$$CCT = CT + (WF_{ij} - 1) << 12.$$

if $CCT < TS_{ij} + J_{ij}''$ is false, then queue (i,j) is considered running behind the current time (S850) Therefore, in order to catch up with the current time, the queue is scheduled at the minimum guaranteed rate, $M_{ij}$, with the priority bit, $P_{ij}$, set equal to one (steps S865 and S875). Otherwise, if $CCT < TS_{ij} + J_{ij}''$ is true, the value of $S_{ij}$ is tested in step S860. If $S_{ij} = 0$, the queue is scheduled at the rate $R_{ij}$ with $P_{ij} = 0$ (steps S870 and S880). Otherwise, the routine proceeds to steps S865 and S875 and the queue is scheduled at the minimum guaranteed rate with priority $P_{ij} = 1$.

When $TS_{ij}$ is updated by adding to it either $J_{ij}$ or $I_{ij}$, an overflow bit, $Z_{ij}$, results. If $Z_{ij} = 1$, the timestamp $TS_{ij}$ has advanced to the next cycle, hence, $WF_{ij}$ should be decremented by one. Otherwise, $WF_{ij}$ remains unchanged. This is accomplished in step S890.

5.3 Service Scheduling

Figure 9:
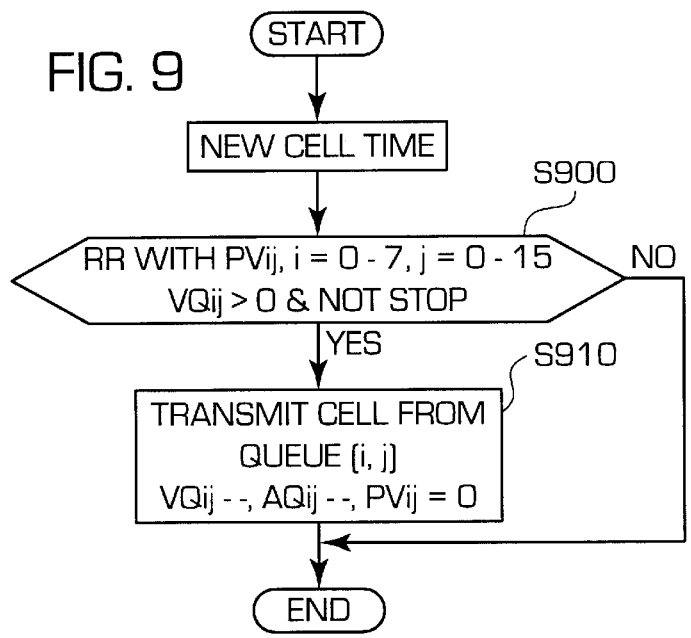
FIG. 9 is a flow diagram for serving cells from virtual queues.

During each cell time, at most one cell is transmitted from an input module onto the core TDM bus to its destination output port. As shown in FIG. 9, the queue from which to send the cell is determined by a round-robin with priority search based on the priority bits $PV_{ij}$ (step S900). In the stage two scheduler, a queue is considered eligible for service if $VQ_{ij} > 0$ and the destination OP buffer for the queue is not in the stop mode. If an eligible queue is found (yes in step S900), the first cell in the queue is transmitted over the TDM bus (step S910). Also, in step S910 both $VQ_{ij}$ and $AQ_{ij}$ are decremented by one and the virtual queue priority bit, $PV_{ij}$, is reset to zero. Recall that the value of $VQ_{ij}$ indicates the number of cells that are ready for servicing.

5.4 High-level Hardware View

Figure 10:
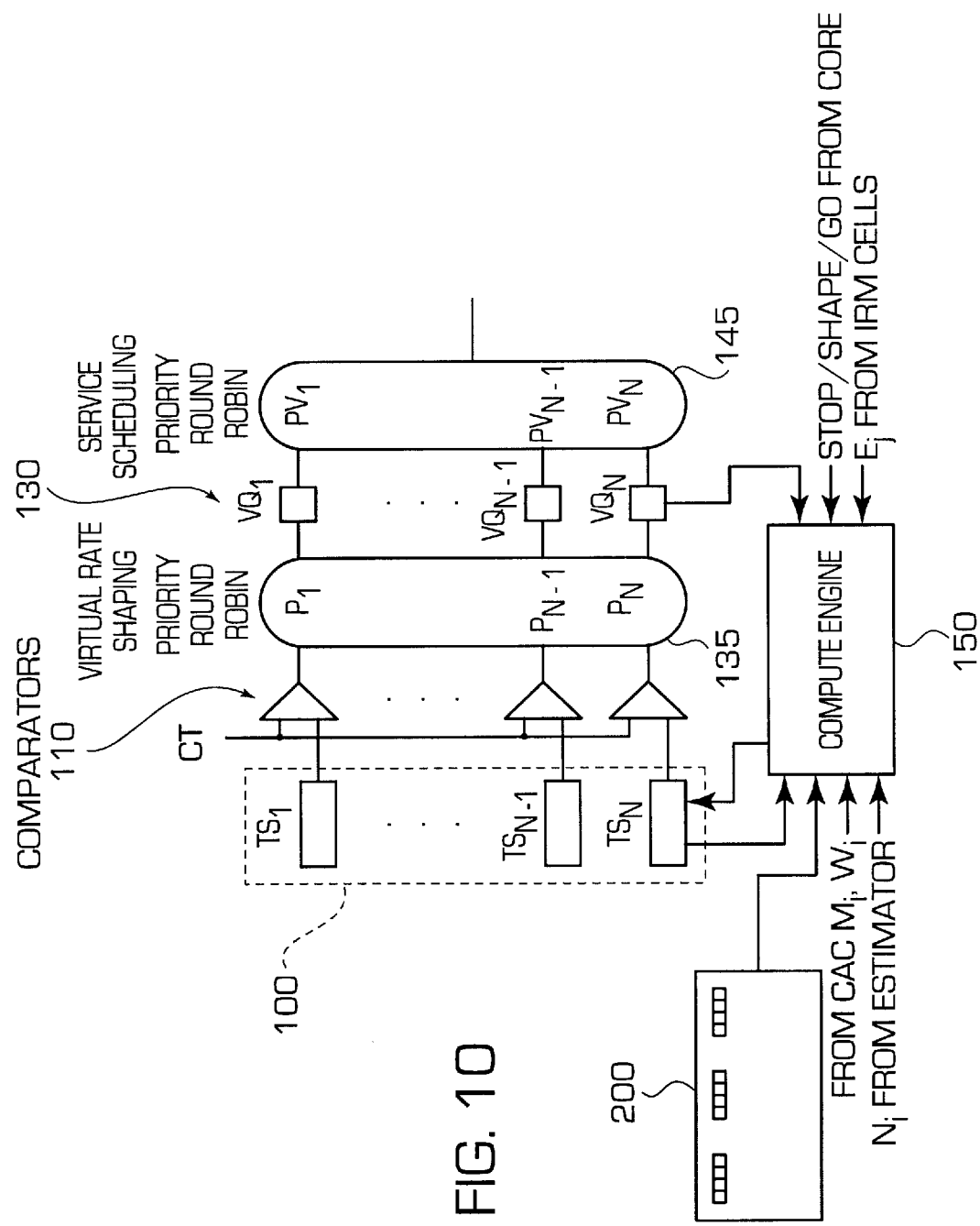
FIG. 10 is a block diagram of a scheduler according to the preferred embodiment of the present invention.

FIG. 10 shows a high-level view of the hardware for carrying out the scheduling operations. The main components are:

1. Storage for the timestamps $TS_{ij}$. These can be implemented in the form of a plurality of registers 100.
2. Array of comparators 110. The comparator associated with queue (i,j) compares $TS_{ij}$ and CT.
3. Storage for the actual queues $AQ_{ij}$. This can be implemented as an array of counters 200.
4. Storage for the virtual queues $VQ_{ij}$ 130.
5. Block 135 which performs priority round-robin (PRR) with respect to the outputs of the comparators (virtual rate shaping).
6. Block 145 which performs PRR with respect to the virtual queues (service scheduling).
7. Compute engine 150.
8. "Stop/shape/go" signals from the core switch.

The PRR 135 for virtual rate shaping uses the priority bit Pi for queue (i,j). The virtual rate shaper looks for a queue (i,j) with $TS_{ij} \leq CT$ with priority given to queues with $P_{ij} = 1$. If $AQ_{ij} > VQ_{ij}$, the virtual queue, $VQ_{ij}$, is incremented by one. The PRR 145 for service scheduling serves the virtual queues with $VQ_{ij} > 0$ in round-robin fashion with priority given to those queues with $PV_{ij} = 1$. Virtual queue (i,j) is eligible for service only if there is no stop signal corresponding to the destination output port j.

The compute engine 150 dynamically updates the rates according to the DRC scheduling. The rate R is computed according to $$R_{ij} = M_{ij} + w_i N_{ij} E_j, \quad (5)$$

based on:
  Information from the CAC:
    The minimum guaranteed rate $M_{ij}$
    The class weight $w_i$
  Stop/go/shape feedback from the core switch module.
  The estimated number of active connections, $N_{ij}$, associated with queue (i,j).
  The excess rate $E_j$, carried in IRM cells from output module j.

The compute engine also updates the timestamps $TS_{ij}$ according to the scheduling and rescheduling algorithms described in subsection 5.2.

5.5 Estimating Number of Active VCs

The number of active VCs, $N_{ij}$, for queue (i,j) is used in the computation of the rate $R_{ij}$ and in the ER values which are computed at the output modules. For real-time connections, the number of active VCs is taken to be the number of VCs which have been accepted by the CAC algorithm. For non-real-time connections, such as UBR and ABR, the number of VCs accepted by the CAC may be far greater than the actual number of VCs active at a given time. This is because non-real-time VCs generally do not pay for guaranteed QoS and hence may be idle for long periods of time.

Thus, a method of estimating the number of VCs for non-real-time traffic is needed. For the 40 G switch of the preferred embodiment, a simple VC table lookup method is used. The table consists of a one-bit entry (initialized to zero), along with a queue identifier (i,j), for each non-real-time VC. Time is divided into intervals of length Ts. When a cell belonging to VC k arrives in an interval, if the corresponding table entry is a zero, the entry is set and the count $N_{ij}$ is incremented by one. Otherwise, if the table entry is already set, no action is taken. At the end of the interval, $N_{ij}$ represents an estimate of the number of active VCs over the interval. Before the start of the next interval, the counter $N_{ij}$ are all cleared. A smoother estimate of the number of active VCs is obtained by exponential averaging:

$$\overline{N}_{ij}(n) = \epsilon N_{ij}(n) + (1-\epsilon) N_{ij}(n-1),$$

where $\epsilon \in (0,1)$.

6. Rate Computation

6.1 DRC Rate

6.1.1 Single-loop Feedback

Figure 11:
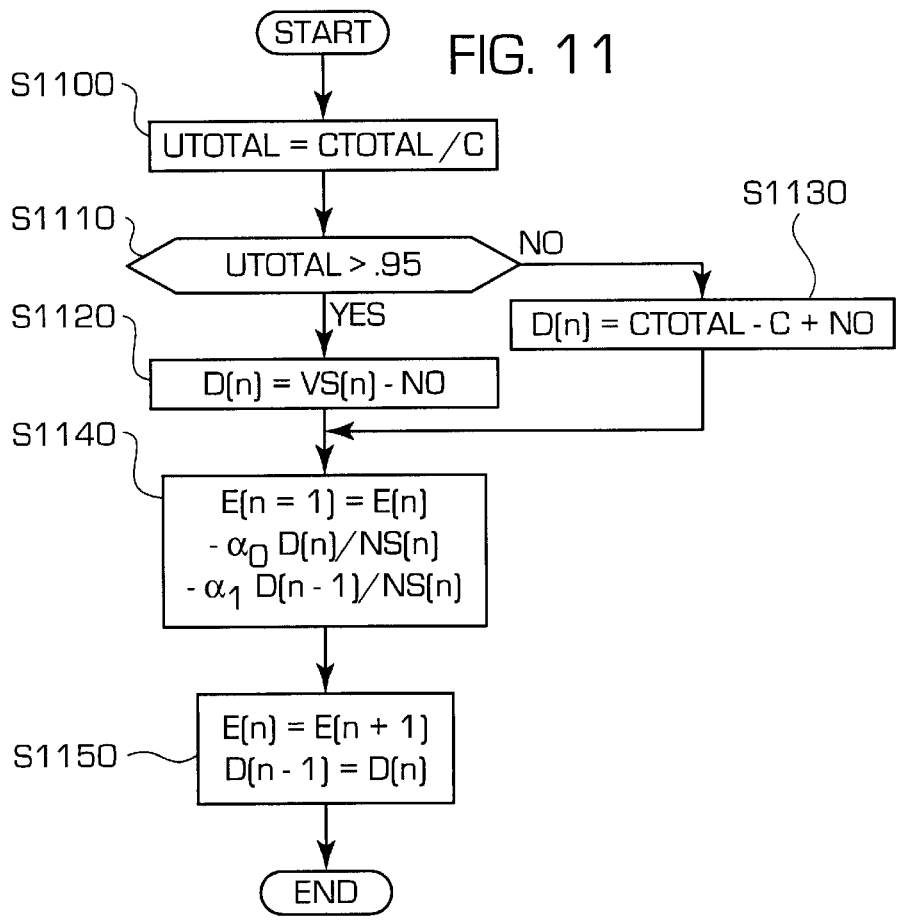
FIG. 11 is a flow chart for the algorithm for rate computation for DRC scheduling.

The general structure of a single feedback loop is depicted in FIG. 2b. The rate values $E_j$ (corresponding to output module j) and $\overline{E}_j$ (corresponding to output line j) for DRC scheduling at the IM and OM, respectively, are computed once every 0.5 ms (see section 4). We shall explain how the DRC rate E is computed; $\overline{E}$ is computed in a similar fashion. FIG. 11 shows a flow chart diagram for the computation of the DRC scheduling rates. In FIG. 11, E(n) denotes a generic DRC rate value computed during the nth (0.5 ms) sampling interval. The symbol VS(n) denotes the sum of the virtual queue sizes corresponding to the bottleneck point. For the DRC value $E_j$, VS(n) represents the sum of all virtual queues destined to output port j over all input modules. Similarly, NS(n) denotes the total number of active VCs destined to output module j over all input modules. For DRC value $E_{jk}$, VS(n) represents the sum of all virtual queues corresponding to output module j, output line k. In this case, NS(n) denotes the number of active VCs in output module j destined for output line k.

A closed-loop proportional-derivative controller is used to compute E based on observations of the aggregate virtual queue length at the OP bottleneck. When the OP channel utilization exceeds a value $U_0 (\approx 95\%$, see step S1110), the controller adjusts the value of E so as to maintain the aggregate virtual queue length corresponding to the OP bottleneck close to a target value $N_0$. When the OP channel utilization lies below $U_0$, the controller adjusts E so that utilization will be brought close to $U_2$.

Let $C_T(n)$ denote a count of the number of cells observed at the output of the OP during the nth scanning interval. If C is the number of cell times during one scanning interval, the utilization at the nth interval is computed as $U(n)=C_T(n)/C$ (step S1100). Let $V(n)$ denote the sum over all IMs of the virtual queue lengths corresponding to the OP during the nth interval. If $U(n) > U_0$, the error is computed as $$D(n) = V(n) - N_0,$$

where $N_0$ is the target aggregate virtual queue length. Otherwise, the error signal is computed based on a target utilization, $C_0 = U_0 C$ and the error signal is computed as $$D(n) = C_T(n) - C_0$$

During each scanning interval, the bottleneck rate is computed using the following proportional derivative (PD) control equation, which attempts to drive the error to zero (step S1140):

$$E(n+1) = E(n) - \alpha_0 D(n) - \alpha_1 D(n-1).$$

The coefficients $\alpha_0$ and $\alpha_1$ are constants which are designed to ensure system stability and fast response time. In simulation experiments performed by the present inventors, the constants were set to: $\alpha_0 = 1.25$, and $\alpha_1 = -0.75$. The condition that the rate must be greater than zero, is ensured via the operation $$E(n+1) = \max\{E(n+1), 0\}.$$

The rate value must also be limited by the bottleneck line rate; i.e., $$E(n+1) = \min\{E(n+1), C\}.$$

The rate is computed in units of [cells/0.5 ms]. The error signals $D(n)$, $D(n-1)$ and the value $E(n)$ are stored as $D(n-1)$ for the next rate computation (step S1150).

6.1.2 Dual-loop Feedback

Dual-loop feedback requires that cells are queued in the input modules according to output line (FIG. 2c). Also, counters must be maintained of the number of cells queued for each output line. Let $AQ_{jk}$ denote the number of cells queued for output line k in output module j. In this case, a DRC rate, $E_{jk}$ (corresponding to output line k in output module j, is computed once every 0.5 ms (see section 4.4.2). The computation of $E_{jk}$ is similar to the computation of $E_j$ discussed in the single-loop case. However, in this case, the actual queue size $AQ_{jk}$ is used in place of the virtual queue count denoted as VS in FIG. 11. The queue size $AQ_{jk}$, is also used in the computation of the ABR explicit rate for output line k in output module j as discussed next.

6.2 ABR Explicit Rate
6.2.1 Output Module Bottleneck

For ABR service, the explicit rate (ER) values are computed based on the sizes of the actual ABR-class queues. The method of ABR rate computation described here somewhat resembles the one developed in the above-cited ABR Service article by Kolarov and Ramamurthy, with modifications to handle the higher 2.4 Gbps line speed and for switch-wise implementation. The ABR rate computation is also performed once every 0.5 ms. For each destination op, an ER value, $ER_j = 1, \ldots, 16$ is computed.

Figure 12:
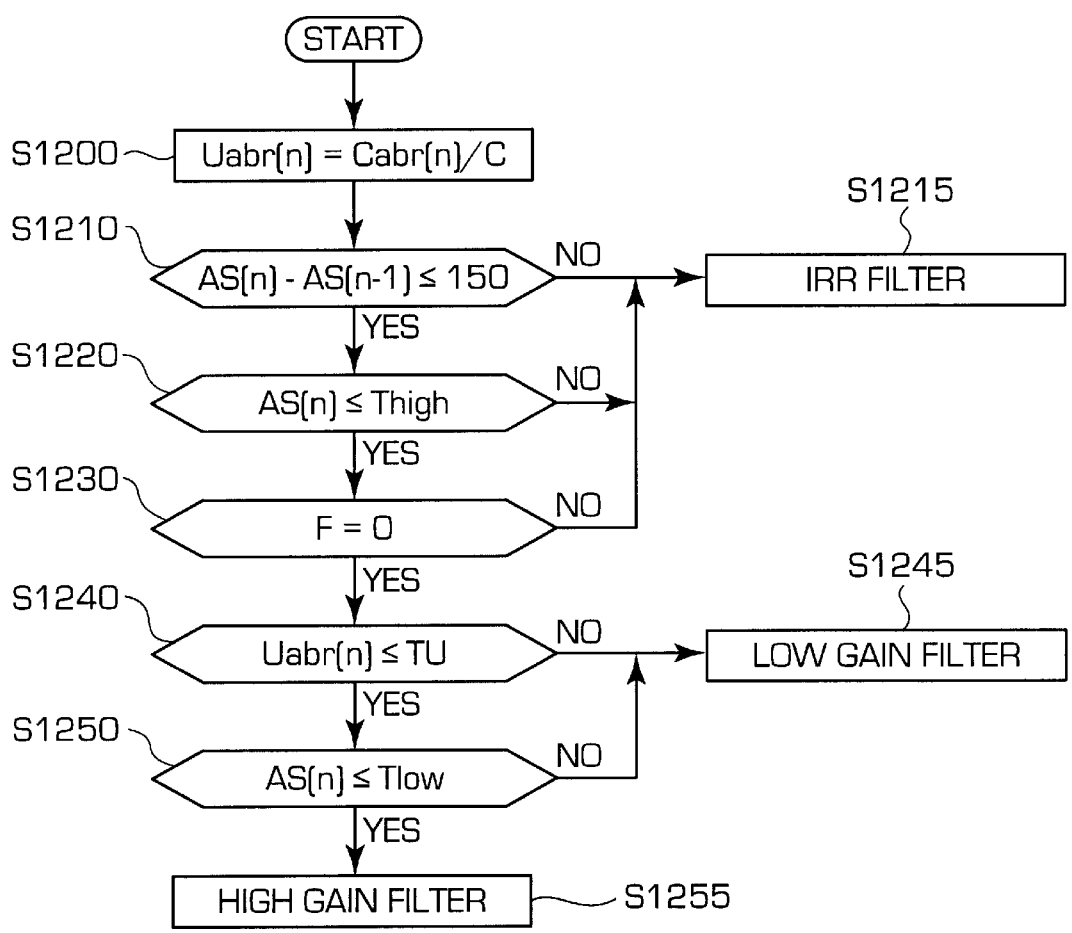
FIG. 12 is a flow chart for explicit rate computation for ABR.

FIG. 12 gives a flow chart for the computation of the explicit rate ER. The flow chart applies to both the output module OM bottleneck and the output line bottleneck. $C_{abr}(n)$ denotes the number of ABR cells which arrive during the nth 0.5 ms interval. In step S1200 the utilization for ABR during the nth interval is computed as:

$$U_{abr}(n) = C_{abr}(n)/C,$$

where C is the total number of cell times in the 0.5 ms interval at the bottleneck rate.

Let AS (n) denote the size of the actual ABR queue corresponding to the bottleneck point (output module or output line) for the nth interval. That is, AS(n) is the sum of the actual queue sizes for all ABR queues destined for the given bottleneck. The value AS(n-1) is stored in memory. If the difference between AS(n) and AS(n-1) exceeds a threshold (exemplified in step S1210 as 150 cells), this indicates that the ABR queue is growing too quickly and a fast control must be used. Therefore, the IRR filter is called in step S1215. The IRR filter is also called if AS(n) exceeds the threshold $T_{high}$ (step S1220) or if the flag F=1 (step S1230).

In step S1240, if it is determined that the utilization of ABR traffic is less than the target, the routine proceeds to step 1250. Otherwise, the routine proceeds to step 1245 and low gain filter is applied. In step 1250, is it is determined that the sum of actual ABR cells is less than the low threshold, than the routine proceeds to step 1255 where a high gain filter is applied. Otherwise, the routine reverts to step 1245 and the low gain filter is applied.

Figure 13:
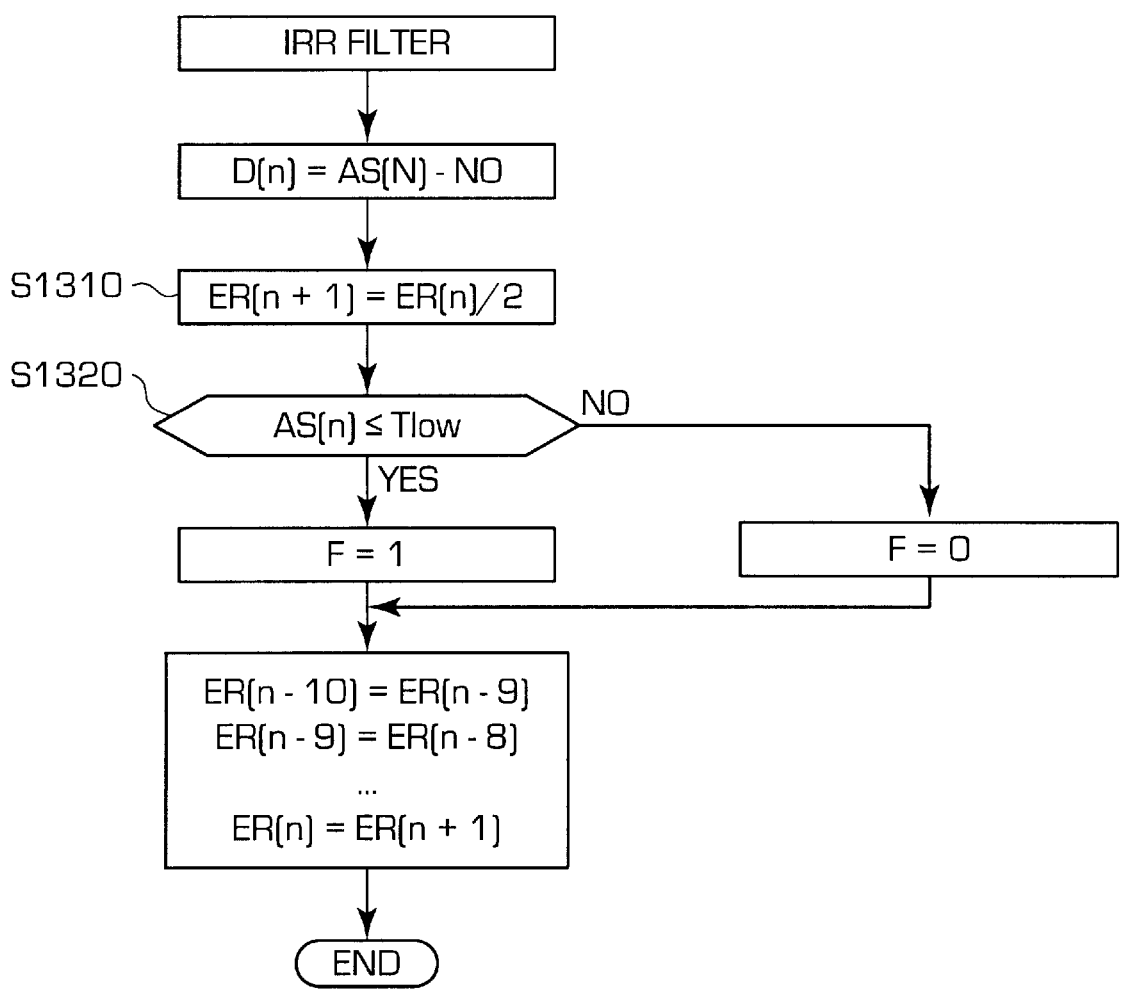
FIG. 13 is a flow chart of the IRR filter for ABR.

FIG. 13 shows the operation of the IRR filter. The IRR filter simply sets the ER rate equal to a fraction of the DRC local rate E. In this case, $$ER(n+1) = E(n)/2$$

(step 1310). The IRR filter sets or resets the flag F according to whether the value of AS (n) is larger than or smaller than the threshold $T_{low}$ (step 1320). Note from FIG. 12 that as long as F=1, the IRR filter will be called. This places a tight control on ABR traffic. Note in FIG. 12 that the error signal $D(n-1)$ is updated and stored even though it is not used in the IRR filter.

Figure 14:
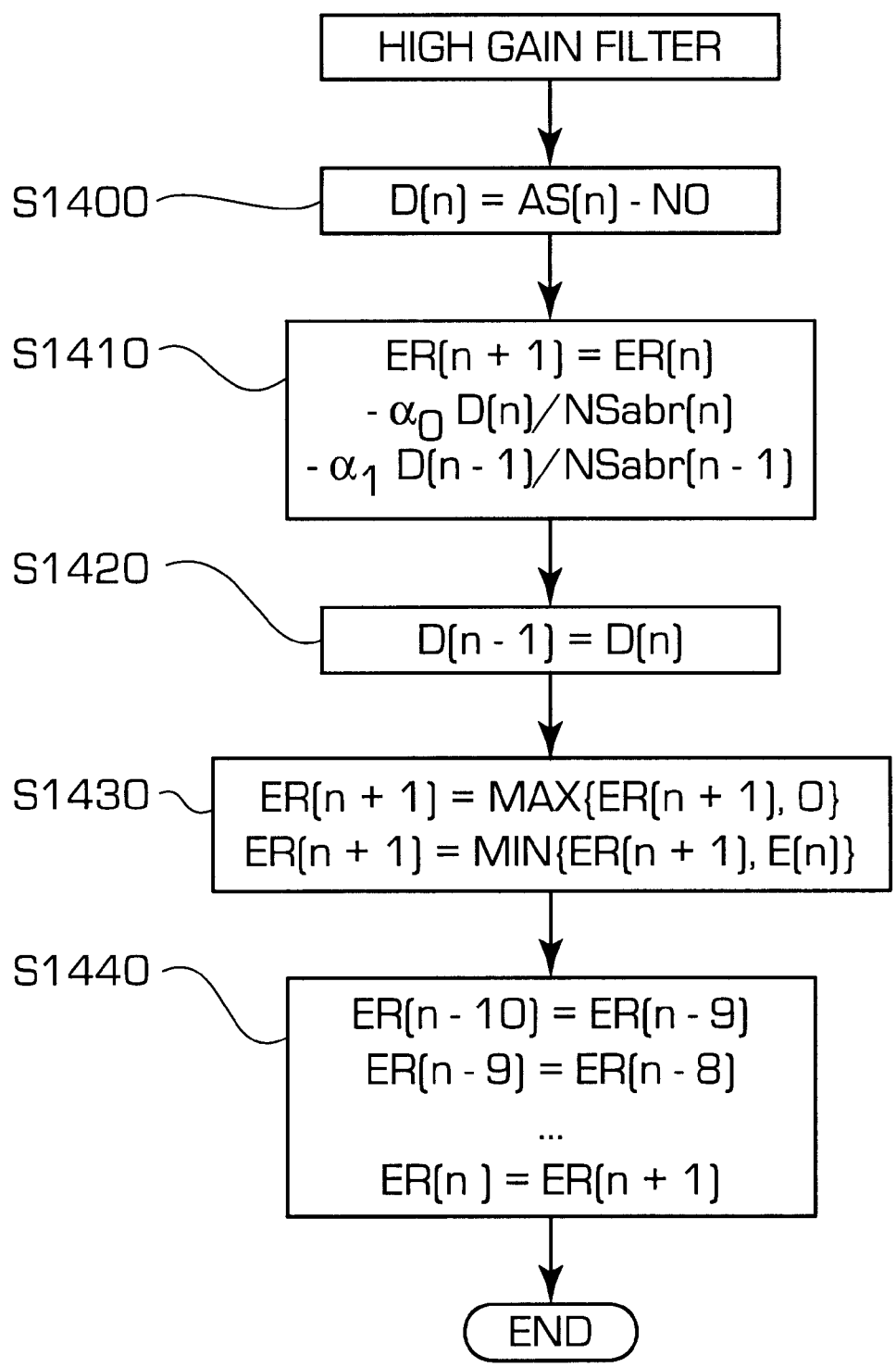
FIG. 14 is a flow chart for the high gain filter for ABR.

FIG. 14 shows the operation of the high gain filter. The main control equation is:

$$ER(n+1) = ER(n) - \alpha_0 D(n)/NS_{abr}(n) - \alpha_1 D(n-1)/NS_{abr}(n-1)$$

where $NS_{abr}(n)$ is an estimate of the sum of all active ABR VCs corresponding to the given bottleneck, weighted by the ABR class weight $W_{abr}$. The values of the filter coefficients are the same as in the local DRC filter, i.e., $\alpha_0 = 1.2$, $\alpha_1 = -0.75$. For the high gain filter, the filter coefficients are scaled by $NS_{abr}$.

The routine proceeds as follows. In step 1400 the difference between the actual and target queue length is determined. In step 1410 the high gain filter is applied using the difference calculated in step 1400. In step 1420 $D(n)$ is replaced by $D(n-1)$ in preparation for the next iteration. In step 1430, taking the max$\{ER(n+1), 0)$ ensures that $ER(n+1)$ is not negative; while taking min$\{(ER(n+1)\ E(n)\}$ ensures that $ER(n+1)$ is not longer than the local DRC rate $E(n)$ In step 1440 all the ER values are shifter in time.

In the low gain filter (see FIG. 15), the control equation is:

$$ER(n+1)=ER(n)-\alpha_0 D(n)-\alpha_1 D(n-1)-\beta_0 ER(n)-\beta_1 ER(n-1)-\ldots -\beta_{10} ER(n-10). \quad (6)$$

Note that the coefficients are not scaled by $NS_{abr}$ for the low gain filter. The coefficient values for the low gain filter are given in Table 3.

TABLE 3

Coefficient values for low gain ABR filter.

| Coefficient | Value |
|---|---|
| $\alpha_0$ | 0.0627 |
| $\alpha_1$ | −0.0545 |
| $\beta_0$ | 0.8864 |
| $\beta_1$ | 0.0955 |
| $\beta_2$ | 0.0545 |
| $\beta_3$ | 0.0136 |
| $\beta_4$ | −0.0273 |
| $\beta_5$ | −0.0682 |
| $\beta_6$ | −0.1091 |
| $\beta_7$ | −0.1500 |
| $\beta_8$ | −0.1909 |
| $\beta_9$ | −0.2318 |
| $\beta_{10}$ | −0.2727 |

Figure 15:
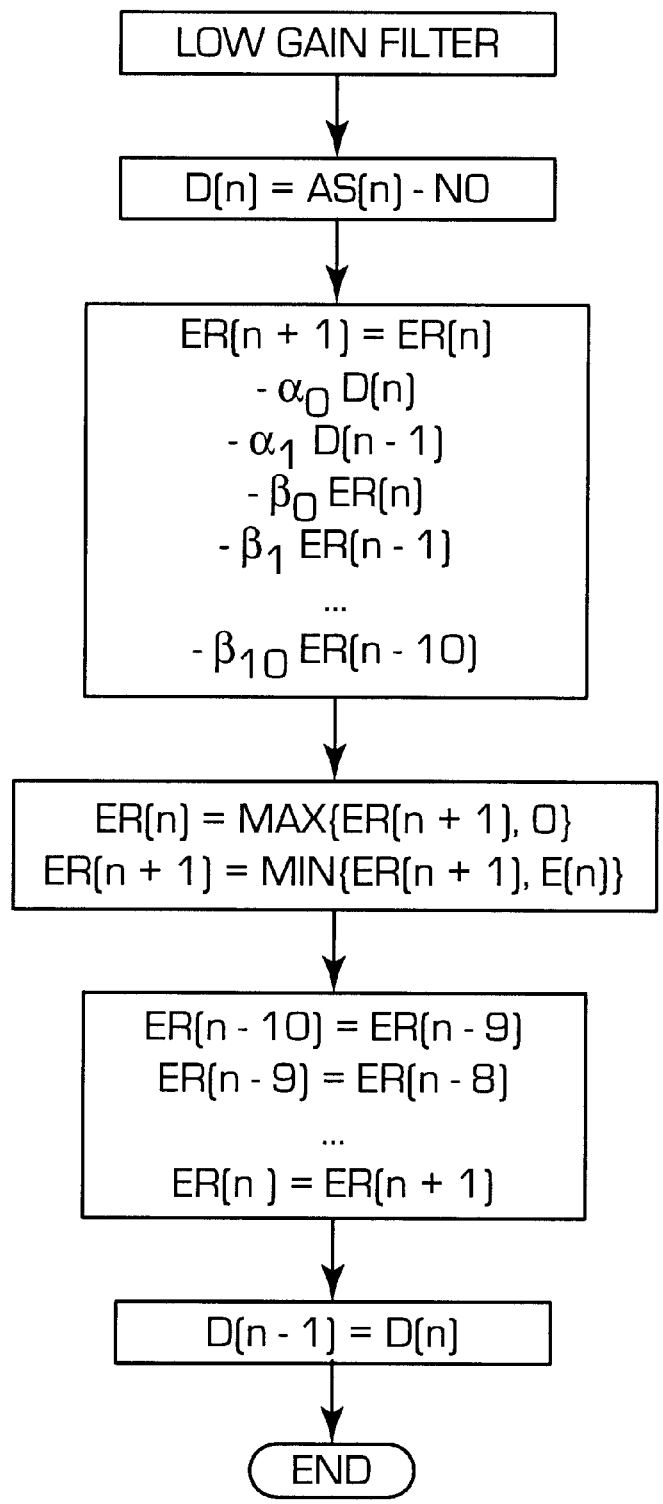
FIG. 15 is a flow chart of a low gain filter for ABR.

The routine for the low-gain filter is identical 30 to that of the high-gain filter, except that the gain equation is different. Therefore, the explanation of the routine of FIG. 15 is omitted herein.

6.3 Transmission of Control Information

All DRC rates and ABR ER rate computations are performed at the respective OMs. During each scanning interval, each IM sends queue length information to all the OMs. This information is transmitted via special control cells called internal resource management (IRM) cells. These cells are generated by the IMs and constitute control signaling overhead.

Based on the queue length information, each OM j computes a DRC rate, $E_j$, for local control, and an explicit rate (ER), $ER_j$, for ABR source control. The ABR ER value is transmitted to the remote ABR source via resource management (RM) cells traveling towards the source. Analogously, IRM cells generated by the OM are used to carry the DRC rate information to the IMs.

7. Buffer Management

Operating in conjunction with the scheduler, each IM and OM contains a queue manager which is responsible for buffer allocation. In the large switch architecture according to the preferred embodiment, the OM buffers handle congestion arising from contention at output line bottlenecks, while the IM buffers handle congestion arising from contention at the OP bottlenecks. The queue managers in the IM and OM are independent but have similar architectures. The cell buffers in the IM and OM are shared among all queues, with limits on maximum queue size.

Each queue has pre-assigned cell discard thresholds based on the traffic class and QoS requirement. The discard thresholds are listed as follows in increasing order of size:

Drop CLP=1 cells.

Early Packet Discard (EPD). Drop cells belonging to the new packet.

Partial Packet Discard (PPD). Drop all cells.

The queue manager drops CLP=1 cells in any queue flow which is being shaped to the minimum guaranteed rate. In this way, CLP=0 traffic receives the minimum guaranteed rate.

8. Performance Evaluation

The primary goal of DRC scheduling is to match bottleneck rates in the switch so as to meet the twin objectives of preventing congestion while maintaining high efficiency. In addition, it distributes the unused bandwidth in a fair manner between competing classes. In this section, we present some representative simulation results to highlight the main performance characteristics of DRC scheduling in the switch design.

8.1 Convergence of Rate Control

Figure 16:
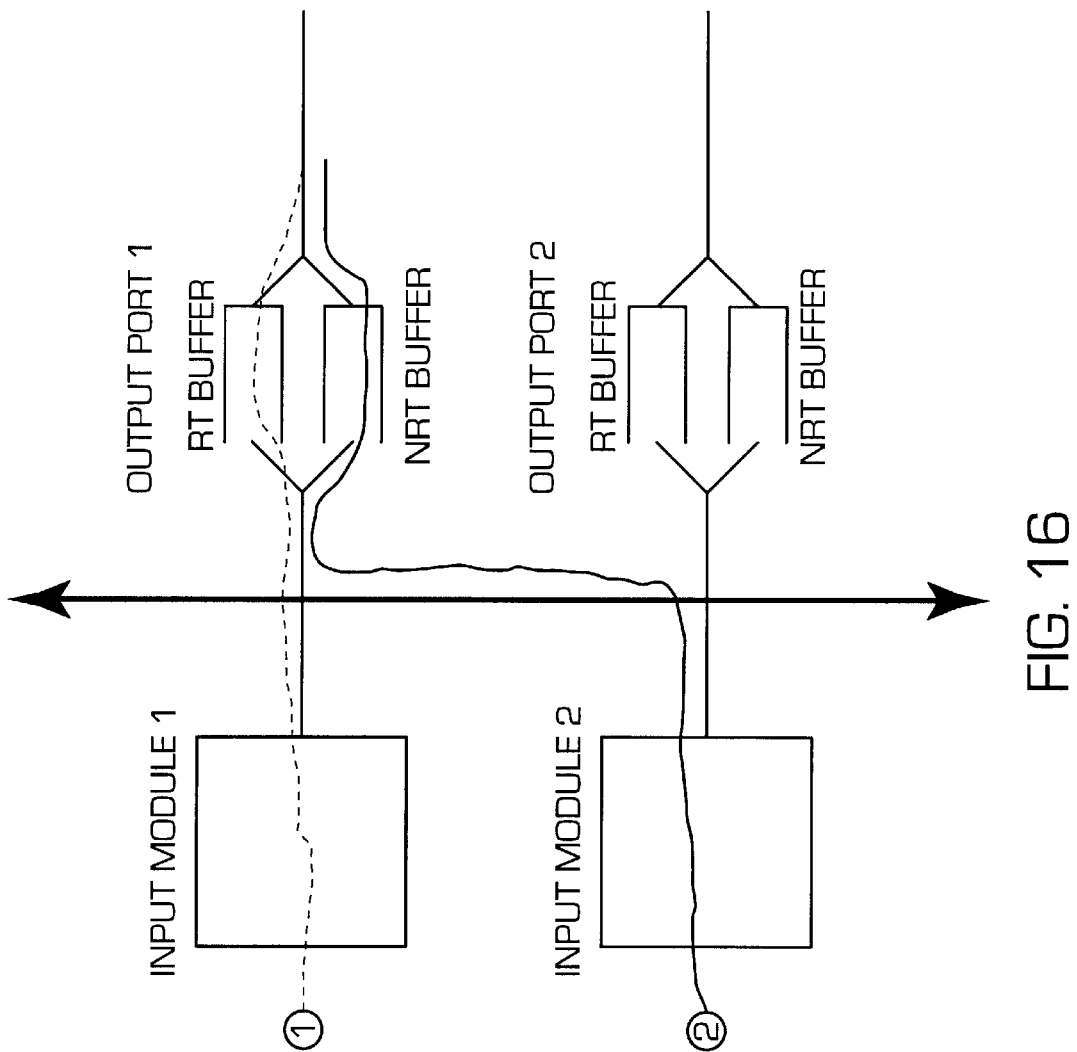
FIG. 16 exemplifies two cell stream flows loading an output port of the core switch.

Consider a switch loaded with two flows destined to the same output port OP 1 on the core switch module (see FIG. 16):

1. A CBR flow on IM 1 with constant input rate 0.58 and minimum guaranteed rate $M_1=0.6$.
2. A UBR flow on IM 2 with constant input rate 0.9 and minimum guaranteed rate $M_2=0.3$.

The UBR flow is misbehaving with respect to its minimum guaranteed rate. This may occur, since UBR sources are not policed at the network edge. In contrast, the CBR source is actually transmitting at less than its minimum guaranteed rate.

The DRC rate for flow i is computed as $R_i=M_i+E$, where E is the available unused bandwidth computed via closed-loop control. At time 0, the system is empty, so initially E=1. Thus, when the two flows are turned on simultaneously at time 0, each flow can initially transmit at the line rate; i.e., $R_i(0^+)=1$, i=1,2. At time $t=0^+$, the aggregate flow rate to OP 1 is 1.48. Hence, the buffer at OP 1 builds and the global virtual queue forms at the input modules. The DRC mechanism reacts by decreasing the DRC rate E.

Figure 17:
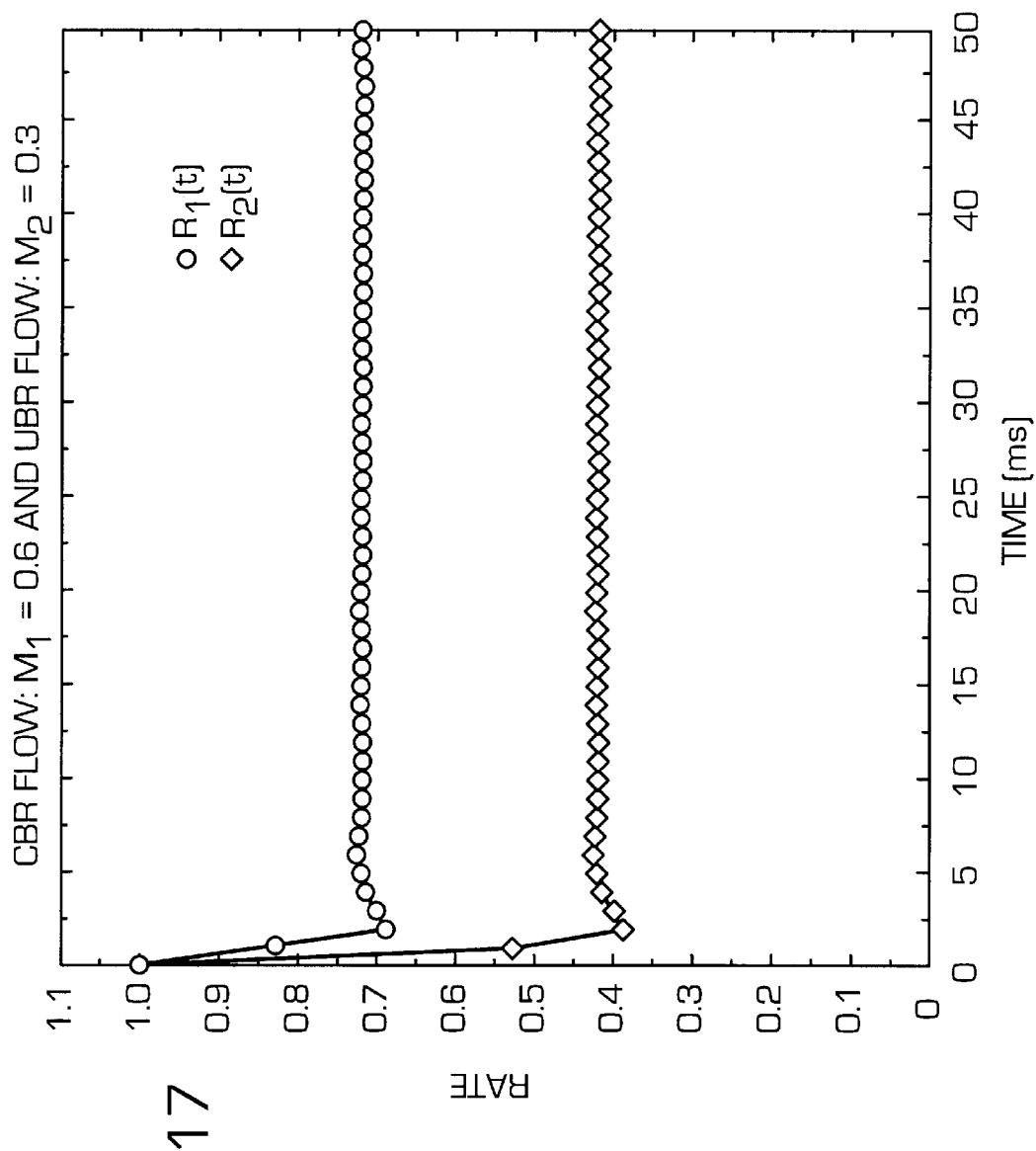
FIG. 17 is a graph of the data collected for a simulation performed with the model of FIG. 16, depicting the convergence of DRC rates for CBR flow and UBR flow.

FIG. 17 shows a plot of the flow rate $R_i$ (t) Observe that the rates converge relatively quickly (in about 6 ms) to steady-state values. The CBR flow uses a bandwidth of 0.58. The UBR flow supplies IM 2 at the rate 0.9, but is guaranteed a throughput of only 0.3. Hence, the correct value for the DRC rate E, is 0.12. Hence, the rates converge as:

$$R_1(t) \to 0.72$$

and $$R_2(t) \to 0.42$$

Note that although the CBR flow is permitted to transmit to OP 1 at rate 0.72, it enters IM 1 at the rate 0.58. On the other hand, the UBR flow is shaped at IM 2 to the rate 0.42. UBR cells will be dropped at the IM after the cell buffer capacity is exceeded.

8.2 Real-time vs. Non-real-time Delay Performance

To examine delay performance, we modify the above example by replacing flow 2 with a UBR flow having random on-off periods. The on and off periods are exponentially distributed with means 8 and 12 [cell times], respectively. During an on period, flow 2 transmits cells to IM 2 at a constant rate 0.93. Hence, the mean rate of low 2 is 0.372. Also, we shall set $M_2=0.38$. The delay metrics obtained from the simulation run are shown in Table 4. The mean delay is given in units of cell times, together with the corresponding 98% confidence intervals. Observe that the CBR flow experiences very little delay and delay jitter.

TABLE 4

Delay performance with CBR flow 1 and UBR flow 2.

| Delay Metric [cell times] | CBR flow 1 | UBR flow 2 |
|---|---|---|
| mean delay | 0.90 ± 0.066 | 2.54 ± 0.71 |
| std. dev. delay | 0.03 | 9.09 |

TABLE 4-continued

Delay performance with CBR flow 1 and UBR flow 2.

| Delay Metric [cell times] | CBR flow 1 | UBR flow 2 |
|---|---|---|
| mean interdeparture | 1.51 ± 0.11 | 1.61 ± 0.11 |
| std. dev. interdeparture | 0.67 | 4.28 |

Now consider the case when flow 1 is changed from the CBR class to the UBR class. As a UBR flow, flow 1 will be buffered in the non-realtime buffer of OP 1, along with flow 2. The simulation results for this example are given in Table 5. Observe that the mean delays of both flows in Table 5 have increased with respect to the corresponding delays in Table 4. Note in particular, that all of the delay metrics of flow 1 as a CBR flow are markedly better than the corresponding metrics as a UBR flow. This example serves to demonstrate the more stringent QoS control which the switch architecture provides for real-time traffic over non-real-time traffic.

TABLE 5

Delay performance with UBR flow 1 and UBR flow 2.

| Delay Metric [cell times] | UBB flow 1 | UBR flow 2 |
|---|---|---|
| mean delay | 1.79 ± 0.42 | 1.59 ± 0.22 |
| std. dev. delay | 5.0 | 3.92 |
| mean interdeparture | 1.5 ± 0.11 | 1.62 ± 0.12 |
| std. dev. interdeparture | 1.03 | 4.26 |

8.3 DRC vs. Static Priority Scheduling

Figure 18:
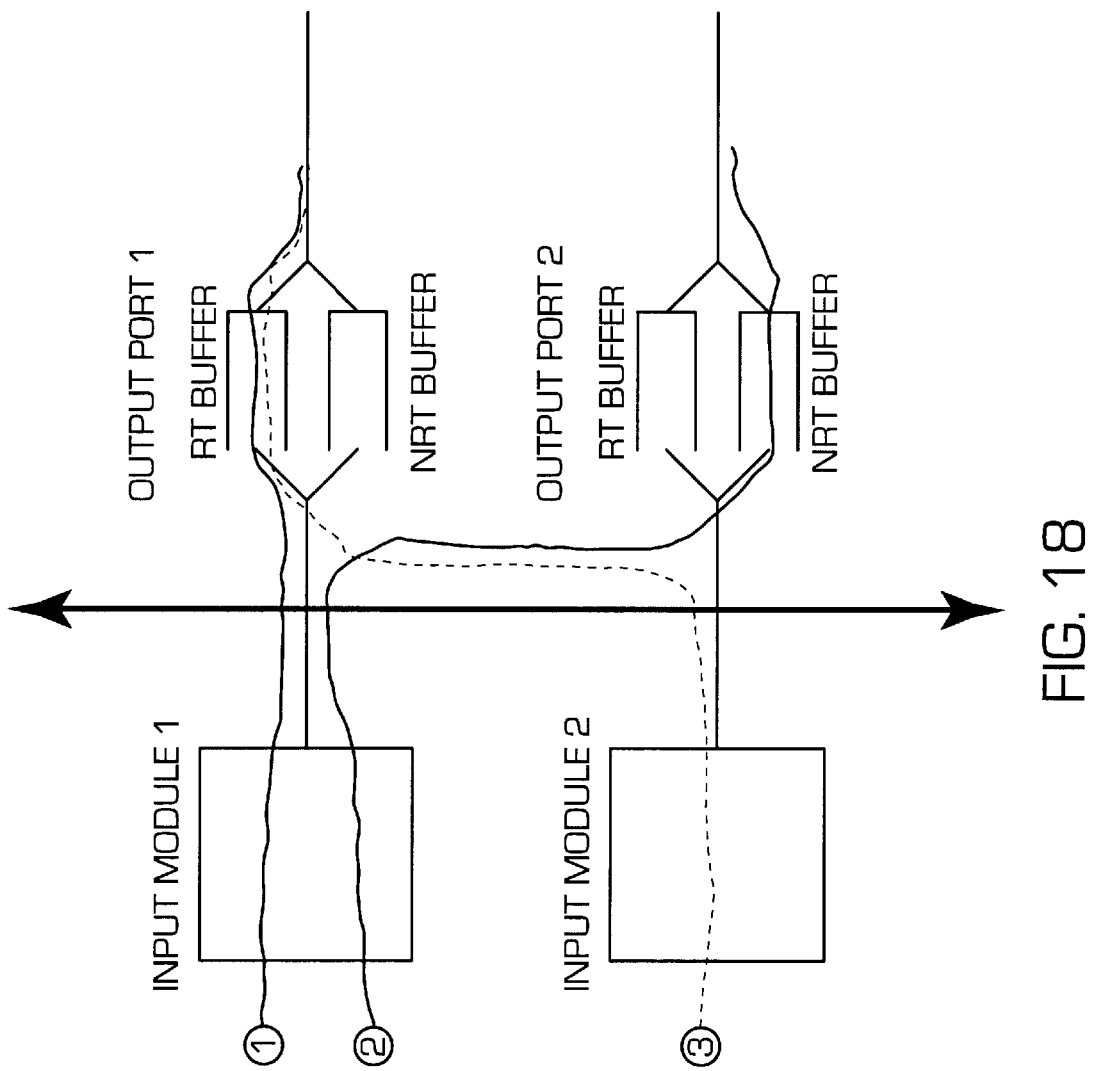
FIG. 18 exemplifies three cell stream flows loading two output ports of the core switch.

FIG. 18 shows a switch loaded with three on-off type flows. The specification of the three flows is given in Table 6. Each flow is associated with a traffic class, mean on and off periods, a rate during the on period, a source input module, a destination output module and a minimum guaranteed rate (for DRC)

TABLE 6

Specification of three flows.

| Flow No. | Class | Mean On | Mean Off | On Rate | IM | OP | $M_i$ |
|---|---|---|---|---|---|---|---|
| 1 | Rt-VBR | 12 | 8 | 0.9 | 1 | 1 | 0.65 |
| 2 | Nrt-VBR | 8 | 12 | 0.93 | 1 | 2 | 0.3 |
| 3 | Rt-VBR | 7 | 13 | 0.93 | 2 | 1 | 0.33 |

Flows 1 and 3 are real-time VBR flows, while flow 2 is a non-real-time VBR flow. Further, flows 1 and 2 compete for service at IM 1. In this example, we are interested in comparing DRC scheduling with static priority scheduling at IM 1. Static priority gives strict priority to real-time VBR flow 1 over non-real-time VBR flow 2. Clearly, flow 1 will achieve the best delay performance under this scheme. However, this may have an adverse effect on flow 2. DRC scheduling provides a compromise by providing rate guarantees to both flows.

The delay results for DRC and static priority scheduling are shown, respectively, in Tables 7 and 8. Observe that under static priority, flow 1 experiences small delay. However, the delay of flow 2 is relatively large. Under DRC, the delay performance of flow 1 is compromised to a small extent, while the delay performance of flow 2 is improved significantly.

TABLE 7

Delay result under DRC scheduling.

| Delay Metric [cell times] | Flow 1 | Flow 2 | Flow 2 |
|---|---|---|---|
| mean delay | 28.0 ± 3.68 | 25.6 ± 3.62 | 34.9 ± 5.53 |
| std. dev. delay | 31.24 | 31.82 | 63.40 |
| mean interdeparture | 1.57 ± 0.11 | 2.24 ± 0.14 | 2.11 ± 0.16 |
| std. dev. interdeparture | 1.02 | 2.00 | 3.14 |

TABLE 8

Delay result under static priority scheduling.

| Delay Metric [cell times] | Flow 1 | Flow 2 | Flow 2 |
|---|---|---|---|
| mean delay | 10.5 ± 1.81 | 121.5 ± 17.4 | 3.25 ± 0.33 |
| std. dev. delay | 26.48 | 104.3 | 7.72 |
| mean interdeparture | 1.56 ± 0.11 | 1.92 ± 0.14 | 1.57 ± 0.11 |
| std. dev. interdeparture | 2.09 | 3.68 | 3.94 |

As can be seen from the above description, the inventive switch efficiently serves cell streams having different QoS requirements. Additionally, the inventive switch efficiently multiplexes unicast and multicast transmission, using an efficient priority scheme. Using buffers at the input, the core, and the output of the switch allows work conservation without exacerbation of loaded bottlenecks. Additionally, a shape feedback signal is used to temporarily stop work conservation in order to alleviate temporary congestion while ensuring the guaranteed minimum rate.

What is claimed is:

1. An ATM switch capable of supporting streams of different classes having various quality of service requirements, comprising:
   a core switch comprising:
      a TDM bus;
      a plurality of input ports connected to said TDM bus;
      a plurality of output buffers connected to said TDM bus;
      a plurality of output ports connected to respective output buffers; and
      a multicast output buffer connected to each of said output ports;
   a plurality of input modules connected to input side of said core switch, each of said input modules comprising:
   a plurality of output port planes corresponding to the number of said output ports, each of said output port planes having a plurality of input buffers;
      an input module scheduler for scheduling cells in said input buffers;
   a plurality of output modules connected to output side of said core switch, each of said output modules comprising:
      a plurality of output line planes, each having a plurality of output line buffers coupled to an output line;
      an output module scheduler for scheduling cells in said output buffers.

2. The ATM switch of claim 1, wherein each of said output buffers of said core switch comprises overflow control for generating a shape signal when level of cells in a respective output buffer reaches a first threshold, and generating a stop signal when the level of cells in the respective output buffer reaches a second threshold.

3. The ATM switch of claim 1, further comprising:

connection admission control for issuing queue timestamps for each cell in said plurality of input buffers;

a timer issuing a current time; and, wherein said input module scheduler further comprises a comparator for comparing said queue timestamps to said current time, and scheduling eligibility for service each of said cells having queue timestamp equal to current time.

4. The ATM switch of claim 3, wherein each of said input module scheduler and output module scheduler further comprises:

a timestamp storage unit for storing the queue timestamps and providing said queue timestamps to said comparator;

a virtual rate shaping unit connected to said comparator for shaping transmission rate of cells eligible for service;

a plurality of virtual queue counters for counting the number of cells eligible for service;

a service scheduling unit for scheduling cells eligible for service;

a compute engine for dynamically updating the timestamps.

5. The ATM switch of claim 4, further comprising a rate feedback from said output modules to said input modules.

6. The ATM switch of claim 1, wherein said plurality of output buffers of said core switch are designated real-time output buffers and wherein said core switch further comprises:

a plurality of non-real-time output buffers corresponding to the number of real-time output buffers and each connected to one of said output ports;

a non-real-time multicast buffer connected to each of said output ports.

7. An ATM switch capable of supporting cell streams of different classes having various quality of service requirements, comprising:

a core switch comprising:
a TDM bus;
a plurality of input ports connected to said TDM bus;
a plurality of output buffers connected to said TDM bus;
a plurality of output ports connected to respective output buffers; and
a multicast output buffer connected to each of said output ports;
a plurality of output modules connected to output side of said core switch, each of said output modules having a plurality of output lines and comprising:
a plurality of output line planes, each having a plurality of output line buffers coupled to said output lines;
an output module scheduler for scheduling cells in said output buffers;
a plurality of input modules connected to input side of said core switch, each of said input modules comprising:
a plurality of output port planes corresponding to the number of said output ports, each of said output port planes having a plurality of output line planes corresponding to the number of said output lines, each of said output line planes having a plurality of input buffers;
an input module scheduler for scheduling cells in said input buffers.

8. The ATM switch of claim 7, wherein each of said output buffers of said core switch comprises overflow control for generating a shape signal when level of cells in a respective output buffer reaches a first threshold, and generating a stop signal when the level of cells in the respective output buffer reaches a second threshold.

9. The ATM switch of claim 7, further comprising:

connection admission control for issuing queue timestamps for each cell in said plurality of input buffers;

a timer issuing a current time; and, wherein said input module scheduler further comprises a comparator for comparing said queue timestamps to said current time, and scheduling eligibility for service each of said cells having queue timestamp equal to current time.

10. The ATM switch of claim 9, wherein each of said input module scheduler and output module scheduler further comprises:

a timestamp storage unit for storing the queue timestamps and providing said queue timestamps to said comparator;

a virtual rate shaping unit connected to said comparator for shaping transmission rate of cells eligible for service;

a plurality of virtual queue counters for counting the number of cells eligible for service;

a service scheduling unit for scheduling cells eligible for service;

a compute engine for dynamically updating the timestamps.

11. The ATM switch of claim 10, further comprising a rate feedback from said output modules to said input modules.

12. The ATM switch of claim 7, wherein said plurality of output buffers of said core switch are designated real-time output buffers and wherein said core switch further comprises:

a plurality of non-real-time output buffers corresponding to the number of real-time output buffers and each connected to one of said output ports;

a non-real-time multicast buffer connected to each of said output ports.

13. An ATM switch capable of supporting streams of different classes having various quality of service requirements, comprising:

a core switch comprising:
a TDM bus;
a plurality of input ports connected to said TDM bus;
a plurality of output buffers connected to said TDM bus;
a plurality of output ports connected to respective output buffers;
a plurality of input modules connected to input side of said core switch, each of said input modules comprising:
a plurality of input buffers;
a connection admission control assigning a minimum guaranteed rate and an excess share weight for each of said input buffers;
an input module scheduler for scheduling cells in said input buffers according to a rate composed of said minimum guaranteed rate and a share of the available unused bandwidth, said share being proportional to the excess share weight.

14. The ATM switch of claim 13, further comprising a closed-loop controller for adjusting the available unused bandwidth according to cell occupancy of said output buffers.

15. The ATM switch of claim 14, further comprising an overload control for transmitting a shape rate signal from any of said output buffers whenever cell occupancy of a respective one of said output buffers reaches a predetermined shape threshold, and wherein said scheduler is responsive to said shape signal to schedule said input buffers according to the guaranteed minimum rate only.

16. A tripled buffered ATM switch capable of supporting streams of different classes having various quality of service requirements, comprising:

- a plurality of input buffers for queuing incoming cell streams;
- a plurality of core buffers receiving queued cells of said cell streams from said input buffers and providing said queued cell to respective output ports;
- a plurality of output buffers receiving said queued cells from said output ports and providing said queued cell to respective output lines;
- a scheduler for scheduling transmission of said queued cells from said input buffers;
- a first feedback loop from said core buffers to said scheduler, for transmission of load information of said core buffers to said scheduler;
- a second feedback loop from said output buffers to said scheduler, for transmission of load information of said output buffers to said scheduler;
- wherein said scheduler schedules transmission of said queued cells from said input module according to information received from said first and second feedback loops.

17. The tripled buffered ATM switch according to claim 16, further comprising a connection admission control for assigning a minimum guaranteed rate to said cell streams, and wherein said scheduler schedules said queued cells at the input buffers at a rate not less than said minimum guaranteed rate.

18. The tripled buffered ATM switch according to claim 17, wherein said scheduler schedules said queueds at the input buffers according to a dynamic rate which comprises the minimum guaranteed rate plus a distribution of an unused bandwidth determined from the information of said first and second feedback loops.

19. The tripled buffered ATM switch according to claim 18, wherein said connection admission control further assigns queue timestamps to each of said queues, and wherein said scheduler further comprises a comparator for comparing the queue timestamps to current time and defining each queue having a queue timestamp equal to or less than the current time as eligible for service.

20. A scheduler for an ATM switch, comprising:

- a first memory for storing cells timestamps assigned to cells in queues to be scheduled;
- a second memory for storing actual queue load;
- a third memory for storing cells in virtual queues;
- a current time generator generating current time;
- a plurality of comparators for comparing the cells timestamps to current time and designating cells having cell timestamps $\geq$ current time as eligible for service;
- a virtual rate selector for assigning cells from said eligible cells to said virtual queues;
- a service scheduling selector which selects queues for service from said virtual queues;
- a compute engine for scheduling and rescheduling cells in said first memory.

21. A buffer, comprising:

- a first monitoring circuit for monitoring a load level in said buffer and for generating a shape signal when said load level reaches a first threshold, so as to cause input to said buffer to be reduced to a minimum level, and further for generating a stop signal when said load level reaches a second threshold, so as to halt any input to said buffer.

22. The buffer of claim 21, further comprising an estimation circuit for estimating an unused bandwidth available on said buffer and generating a signal indicating said estimated bandwidth.

23. A scheduler for an ATM switch, comprising:

- a first memory for storing queue timestamps assigned to queues to be scheduled;
- a second memory for storing actual queue load;
- a third memory for storing cells in virtual queues;
- a current time generator generating current time;
- a plurality of comparators for comparing the queue timestamps to current time and designating queues having cell timestamps $\leq$ current timestamp as eligible for service;
- a virtual rate selector for assigning cells from said eligible cells to said virtual queues;
- a service scheduling selector which selects queues for service from said virtual queues;
- a compute engine for scheduling and rescheduling cells in said first memory.

* * * * *

UNITED STATES PATENT AND TRADEMARK OFFICE
CERTIFICATE OF CORRECTION

PATENT NO.     : 6,324,165 B1
DATED          : November 27, 2001
INVENTOR(S)    : Ruixue Fan, Brian L. Mark, Gopalakrishnan Ramamurthy It is certified that error appears in the above-identified patent and that said Letters Patent is hereby corrected as shown below:

Column 1,
Line 5, delete "08/929,820" insert -- 08/924,820 --

Column 11,
Line 33, delete "$R_{i=}M_{i+wl}E$" insert -- $R_{i=}M_{i+wi}E$ --

Column 16,
Line 14, delete "$WF_j$" insert -- $WF_{ij}$ --

Column 21,
Line 7, delete "$U_2$" insert -- $U_0$ --

Column 30,
Line 13, delete "$\geqq$" insert -- $\leq$ --

Signed and Sealed this

Twenty-sixth Day of March, 2002

Attest:

JAMES E. ROGAN
Attesting Officer    Director of the United States Patent and Trademark Office